(12) United States Patent
Cingolani et al.

(10) Patent No.: US 11,280,318 B2
(45) Date of Patent: Mar. 22, 2022

(54) WIND TURBINE WITH A TRANSPORTATION SYSTEM FOR MOVING DRIVE TRAIN COMPONENTS

(71) Applicant: Vestas Wind Systems A/S, Aarhus N. (DK)

(72) Inventors: Riccardo Cingolani, Tradate (IT); Joris Kofman, Aalborg Ø (DK); Kim Bredo Rahbek, Hadsten (DK)

(73) Assignee: Vestas Wind Systems A/S, Aarhus N. (DK)

( * ) Notice: Subject to any disclaimer, the term of this patent is extended or adjusted under 35 U.S.C. 154(b) by 79 days.

(21) Appl. No.: 16/640,194

(22) PCT Filed: Aug. 20, 2018

(86) PCT No.: PCT/DK2018/050204
§ 371 (c)(1),
(2) Date: Feb. 19, 2020

(87) PCT Pub. No.: WO2019/042509
PCT Pub. Date: Mar. 7, 2019

(65) Prior Publication Data
US 2020/0182223 A1 Jun. 11, 2020

(30) Foreign Application Priority Data
Aug. 29, 2017 (DK) .......................... PA 2017 70645

(51) Int. Cl.
*F03D 13/40* (2016.01)
*F03D 80/50* (2016.01)
(Continued)

(52) U.S. Cl.
CPC ............ *F03D 13/40* (2016.05); *B66C 23/207* (2013.01); *F03D 15/00* (2016.05); *F03D 80/50* (2016.05);
(Continued)

(58) Field of Classification Search
CPC .......... F03D 13/40; F03D 15/00; F03D 80/50; F03D 80/80; F03D 80/88
See application file for complete search history.

(56) References Cited

U.S. PATENT DOCUMENTS 8,721,258 B2 * 5/2014 Eriksen ................. B66C 23/207
415/4.3
9,228,567 B2 * 1/2016 Bitsch ..................... F03D 13/10
(Continued)

FOREIGN PATENT DOCUMENTS

DE 102011006665 A1 10/2012
EP 2363598 A1 9/2011
(Continued)

OTHER PUBLICATIONS

Danish Patent and Trademark Office, Search and Examination Report in PA 2017 70645, dated Mar. 15, 2018.
(Continued)

*Primary Examiner* — Richard A Edgar
*Assistant Examiner* — Jason G Davis
(74) *Attorney, Agent, or Firm* — Wood Herron & Evans LLP

(57) ABSTRACT

A wind turbine (1) comprising a tower (2) and one or more nacelles (3) mounted on the tower (2) is disclosed, at least one of the nacelle(s) (3) housing one or more drive train components (9,10,11) and a transportation system for moving drive train components (9,10,11) of the wind turbine (1). The transportation system comprises one or more sliding rails (15) configured to carry a drive train component (9, 10,11) during movement, and one or more sledges (19). Each sledge (19) is movably connected to a sliding rail (15), and configured to be attached to a drive train component (9,10,11), thereby allowing the drive train component (9,10, 11) to move along the sliding rail(s) (15). Each sliding rail (15) comprises two or more rail modules (6,13,14) being detachably connected to each other along a direction of movement defined by the sliding rail (15).

14 Claims, 17 Drawing Sheets

(51) Int. Cl.
 *F03D 80/80* (2016.01)
 *F03D 15/00* (2016.01)
 *B66C 23/20* (2006.01)

(52) U.S. Cl.
 CPC .......... *F03D 80/80* (2016.05); *F05B 2230/61* (2013.01); *F05B 2240/916* (2013.01)

(56) References Cited

U.S. PATENT DOCUMENTS

| | | | |
|---|---|---|---|
| 9,709,038 B2* | 7/2017 | Mogensen | ............... F03D 80/00 |
| 10,302,069 B2* | 5/2019 | Mogensen | ............... F03D 13/10 |
| 2010/0034658 A1 | 2/2010 | Numajiri et al. | |
| 2012/0125876 A1 | 5/2012 | Park et al. | |

FOREIGN PATENT DOCUMENTS

| | | |
|---|---|---|
| EP | 3018341 A1 | 5/2016 |
| ES | 2421174 A2 | 8/2013 |
| WO | 0017492 A1 | 3/2000 |
| WO | 2009074859 A2 | 6/2009 |
| WO | 2012079579 A1 | 6/2012 |
| WO | 2013075717 A2 | 5/2013 |

OTHER PUBLICATIONS

European Patent Office, International Search Report and Written Opinion in PCT Application No. PCT/DK2018/050204, dated Apr. 17, 2019.

\* cited by examiner

WIND TURBINE WITH A TRANSPORTATION SYSTEM FOR MOVING DRIVE TRAIN COMPONENTS

FIELD OF THE INVENTION

The present invention relates to a wind turbine comprising a tower and one or more nacelles mounted on the tower. At least one of the nacelles houses one or more drive train components and a transportation system for moving drive train components of the wind turbine. The transportation system comprises one or more sliding rails configured to carry a drive train component during movement.

BACKGROUND OF THE INVENTION

In wind turbines it is sometimes necessary to move drive train components in the nacelle, e.g. in order to mount a drive train component, unmount or dismantle a drive train component, replace a drive train component or perform maintenance or repair on a drive train component. As the size of wind turbines increases, so does the size and weight of wind turbine components, including the drive train components. Thereby it becomes increasingly difficult to handle the drive train components in the nacelle.

WO 2012/079579 A1 discloses a transportation system for transporting at least one drive train component of a wind turbine. The transportation system comprises a displacement system comprising one or more transportation rails being arranged to support the drive train component during displacement thereof.

WO 2013/075717 A2 discloses a tool for moving a drive train component in a nacelle of a horizontal axis wind turbine. The tool may comprise two elongated supporting units and two transport assemblies, each arranged so as to cooperate with a respective of the supporting units.

When movement of large and heavy drive train components is required, the requirement of the size of the transportation rails of WO 2012/079579 A1 and the elongated supporting units of WO 2013/075717 A2 is also increased. This makes it very difficult to handle the supporting rails or elongated supporting units, e.g. during mounting or dismantling of the supporting rails or elongated supporting units.

DESCRIPTION OF THE INVENTION

It is an object of embodiments of the invention to provide a wind turbine with a transportation system for moving drive train components, where the transportation system is easy to handle, even when movement of large or heavy drive train components is required.

According to a first aspect the invention provides a wind turbine comprising a tower, one or more nacelles mounted on the tower, at least one of the nacelle(s) housing one or more drive train components and a transportation system for moving drive train components of the wind turbine, the transportation system comprising:
one or more sliding rails configured to carry a drive train component during movement, and
one or more sledges, each being movably connected to a sliding rail, and each being configured to be attached to a drive train component, thereby allowing the drive train component to move along the sliding rail(s),
wherein each sliding rail comprises two or more rail modules being detachably connected to each other along a longitudinal direction of the sliding rail.

Thus, according to the first aspect, the invention provides a wind turbine comprising a tower and one or more nacelles. It should be noted that the wind turbine according to the first aspect of the invention may have only one nacelle mounted on the tower. In this case the nacelle may advantageously be mounted on top of the tower. Such wind turbines are sometimes referred to as 'single rotor wind turbines'.

As an alternative, the wind turbine according to the first aspect of the invention may have two or more nacelles mounted on the tower. Such wind turbines are sometimes referred to a 'multi rotor wind turbines'. In this case the tower may be provided with one or more arms extending away from a main tower part, each arm carrying one or more nacelles.

In the following, reference to 'the nacelle' should be interpreted to mean the nacelle mounted on top of the tower in the case that the wind turbine is a single rotor wind turbine, and one of the two or more nacelles mounted on the tower in the case that the wind turbine is a multi rotor wind turbine.

At least one of the nacelles houses one or more drive train components. In the present context the term 'drive train component' should be interpreted to mean a component of the wind turbine which forms part of the drive train of the wind turbine. For instance, the drive train component could be or form part of a main bearing, a main shaft, a gearbox or a generator. For instance, the drive train component could be in the form of one or more stages of a gearbox.

The nacelle further comprises a transportation system for moving drive train components of the wind turbine. The transportation system comprises one or more sliding rails and one or more sledges.

Each sliding rail is configured to carry a drive train component during movement. Accordingly, when a drive train component is moved by means of the transportation system, the weight of the drive train component is carried by the sliding rail(s). The drive train component may be supported by the sliding rail(s) from below, or it may be suspended from the sliding rail(s). It should be noted that, in addition to being configured to carry a drive train component during movement, the sliding rail(s) may also be configured to carry an additional drive train component which is not currently being moved. For instance, one drive train component may need to be moved before another, desired drive train component can be moved. In this case the first drive train component may be carried by the sliding rail(s), thereby being temporarily 'stored' while the other drive train component is being moved.

Each sledge is movably connected to a sliding rail, and is configured to be attached to a drive train component. Thus, each sledge is able to move relative to the sliding rail to which it is connected. Simultaneously, it is attached to a drive train component. Therefore, moving sledges attached to a given drive train component relative to the respective sliding rail(s) results in the drive train component performing a corresponding movement relative to the sliding rail(s). Thus, the drive train component is moved along the sliding rail(s) by means of the sledge(s).

The relative movement between the sledge and the sliding rail may be a sliding movement, i.e. the sledge may slide along the sliding rail and the sliding rail and the sledge may be provided with corresponding surfaces allowing this sliding movement with little friction. As an alternative, the sledge may comprise one or more wheels arranged in contact with the sliding rail, or the sliding rail may comprise one or more wheels arranged in contact with the sledge. In this case the relative movement between the sledge and the sliding rail may take place via rotation of the one or more wheels.

Movement of the sledge relative to the sliding rail may, e.g., be provided by means of one or more hydraulic cylinders, e.g. mounted on or forming part of the sledge. In this case, one end of the hydraulic cylinder(s) may be connected to the sliding rail, and the other end of the hydraulic cylinder(s) may be connected to the sledge. Contraction and expansion of the hydraulic cylinder(s) thereby provide the relative movement between the sliding rail and the sledge.

The sledge may further be provided with a locking mechanism, which facilitates locking of the relative movement between the sliding rail and the sledge.

The main direction of movement of a given sledge relative to the sliding rail to which it is connected is preferably defined by an orientation of the sliding rail. The sliding rail(s) may, e.g., be in the form of prismatic members or essentially prismatic members, defining a substantially linear direction. In this case the relative movement between the sledge and the sliding rail may mainly be a substantially linear movement along the substantially linear direction defined by the sliding rail. However, it is not ruled out that minor movements of the sledge relative to the sliding rail take place along directions which differ from the substantially linear direction. This could, e.g., be in order to adjust an orientation of the drive train component relative to the sliding rail. This will be described in further detail below. However, it is not ruled out that the sliding rails are in the form of non-prismatic members. The sliding rails may advantageously be in the form of beams.

Each sliding rail comprises two or more rail modules being detachably connected to each other along a longitudinal direction of the sliding rail. The longitudinal direction of the sliding rail could, e.g., define a direction of linear movement of a drive train component. The direction of movement could, e.g., be the substantially linear direction described above. Each rail module may advantageously define a longitudinal direction, and the rail modules may be attached sequentially, one after the other or end to end, along this direction.

Accordingly, each sliding rail is modular, i.e. it is made from two or more separate pieces which are attached to each other in order to form the sliding rail. This has several advantages.

For instance, when handling a sliding rail it is not necessary to handle the sliding rail in its full length. Instead, the rail modules can be handled separately and assembled in the nacelle, at the position where the sliding rail is supposed to be installed. This is a great advantage in large wind turbines, where the drive train components to be moved are large and heavy, thereby requiring relatively long sliding rails. Due to the modular design, it is still possible to pass the sliding rail(s), rail module by rail module, through a normal service hatch in the nacelle, and the rail modules can easily be moved around inside the nacelle, e.g. from the service hatch to the position where the sliding rail is supposed to be installed. For instance, this makes it possible to provide the sliding rail(s) in a temporary manner, i.e. the rail modules may be transported to the nacelle and assembled into the sliding rail(s) when movement of a drive train component is required, and the sliding rail(s) may be disassembled and the rail modules removed from the nacelle when movement of the drive train component has been completed. Thereby the transportation system does not take up space inside the nacelle permanently.

At least one of the rail modules of at least one of the sliding rails may be attached directly to a drive train component. According to this embodiment, at least one of the sliding rails is mounted on a part of the drive train by attaching at least one of the rail modules to a drive train component. For instance, a rail module which forms an end of a sliding rail may be attached to a drive train component being arranged at one end of the drive train, e.g. a main bearing housing. The other rail modules may then be attached to this rail module, possibly via other rail modules in the sequence of rail modules described above. The drive train components which are not attached to a rail module can then be moved along the sliding rail, in the manner described above.

One advantage of attaching at least one of the rail modules directly to a drive train component as described above is that it is thereby possible to provide an interface portion on the drive train component which defines an appropriate orientation of the sliding rail with respect to an axis of rotation of the drive train. This reduces the time required for aligning the sliding rails as well as the amount of required adjustments of the orientation of a drive train component during movement. Furthermore, some of the drive train components, e.g. the main bearing housing, are large and heavy, and are therefore capable of handling substantive loads. It is therefore an advantage to use such a drive train component as an attachment point, and thereby a point of load transfer, for the sliding rail.

It is, however, not ruled out that two or more rail modules of a given sliding rail are attached to separate drive train components, as long as at least one drive train component is allowed to move relative to the sliding rail.

According to one embodiment, at least two of the sliding rails may each have one of their rail modules attached to the same drive train component. This provides a symmetric and stable transportation system.

The wind turbine may further comprise a support structure arranged to support the sliding rails at one end, the support structure being arranged between the sliding rails and a load carrying structure of the nacelle. According to this embodiment, the sliding rails may, e.g., be supported at one end by a rail module being attached to a drive train component, and at an opposite end by the support structure. The support structure is arranged between the sliding rails and a load carrying structure of the nacelle. Accordingly, the support structure forms a load carrying connection between the sliding rails and the load carrying structure of the nacelle, and the sliding rails rest on the load carrying structure of the nacelle, via the support structure.

The wind turbine may further comprise an adjustment mechanism for adjusting an inclination of the sliding rails relative to the nacelle. According to this embodiment, the inclination of the sliding rails, i.e. the orientation of the substantially linear direction defined by the sliding rails, can be adjusted by means of the adjustment mechanism. Thereby it is possible to accurately align the sliding rails, and thereby the direction of the main movement of the drive train component to be moved, relative to a desired direction of movement of the drive train component. The desired direction of movement could, e.g., be a direction defined by a main shaft of the wind turbine. Furthermore, it is possible to accurately align the sliding rails relative to each other, thereby ensuring a smooth movement of the drive train component. Finally, adjustments of the inclination of the sliding rails could be used for compensating for deflections of the sliding rails due to the weight of a drive train component being carried by the sliding rails.

The adjustment mechanism could, e.g., be mechanically operated, such as in the form of a threaded rod, which may be manually operated. Alternatively, the adjustment mechanism may be of a hydraulic kind, e.g. being operated by means of one or more hydraulic pistons.

The sliding rails may extend along a direction which is substantially parallel to a direction defined by a main shaft of the wind turbine. According to this embodiment, the main movement of the drive train component to be moved takes place along a direction which is substantially parallel to the main shaft. This is an advantage, because the main shaft defines an axis of rotation for the drive train, and thereby movement of a drive train component relative to the other drive train components along this direction ensures that the drive train components are still appropriately aligned with respect to each other. In particular, it is ensured that any meshing parts of neighbouring drive train components are appropriately aligned, thereby avoiding, or at least minimising, damage to the meshing parts due to misalignment.

The transportation system may comprise at least two sliding rails extending below a centre of gravity of the drive train components. According to this embodiment, at least two sliding rails are arranged below the centre of gravity of the drive train, e.g. completely below the drive train, thereby allowing a drive train component being moved to rest on the sliding rails, i.e. the drive train component is supported by the sliding rails from below. By providing at least two sliding rails it is ensured that a stable and symmetrical support is provided for the drive train component.

Each sledge may comprise a guiding part comprising a guiding track, the guiding part being configured to be mounted movably on a sliding rail, and a mating part comprising a protruding part being arranged in engagement with the guiding track of the guiding part, the mating part being configured to be attached to a drive train component, and relative movement between the guiding part and the mating part of one or more sledges may cause a change in orientation of a drive train component having the sledge(s) attached thereto, relative to the sliding rail(s), due to the protruding part of the mating part moving along the guiding track of the guiding part.

According to this embodiment, each sledge is of a kind which comprises a guiding part and a mating part. The guiding part is configured to be mounted movably on a sliding rail, and the mating part is configured to be attached to a drive train component. Furthermore, the guiding part comprises a guiding track, and the mating part comprises a protruding part being arranged in engagement with the guiding track of the guiding part. Thus, the protruding part of the mating part may move relative to the guiding part along a path defined by the guiding track, and thereby the mating part and the guiding part are allowed to perform corresponding movements relative to each other.

Since the mating part is attached to the drive train component, the drive train component is thereby allowed to perform movements relative to the guiding part, corresponding to the path defined by the guiding track. This may be used for changing the orientation of the drive train component in the following manner. The guiding part and the mating part may be caused to move relative to each other. Thereby the protruding part of the mating part is forced to move along the path defined by the guiding track of the guiding part. This causes the mating part, and thereby the drive train component, to move relative to the guiding part, along the path defined by the guiding track, and this in turn causes a change in orientation of the drive train component relative to the sliding rail(s).

Causing a protruding part to move along a guiding track is a very simple and reliable way of providing a change in orientation of a drive train component.

The change in orientation of the drive train component could, e.g., be in the form of a linear movement along a direction being substantially perpendicular to the direction defined by the main shaft of the wind turbine. Alternatively or additionally, the change in orientation of the drive train component could, e.g., be a rotation of the drive train component about a rotational axis defined by the main shaft of the wind turbine. Alternatively or additionally, the change in orientation of the drive train component could, e.g., be a rotation of the drive train component about a rotational axis being substantially perpendicular to the rotational axis defined by the main shaft of the wind turbine. The could, e.g., result in a change in inclination of the drive train component relative to the rotational axis defined by the main shaft of the wind turbine.

At least one of the drive train components may be provided with one or more interface portions configured to have a rail module attached thereto. According to this embodiment, a rail module may be attached directly to the drive train component via one of the interface portions. Thereby it is very easy to mount and assemble the sliding rail inside the nacelle. Furthermore, it can easily be ensured that sliding rails are mounted in the nacelle with a suitable inclination, e.g. parallel to the direction defined by the main shaft of the wind turbine.

The interface portions may also be used for attaching a sledge, e.g. a mating part of a sledge, to the drive train components. In this case, only one kind of interface portion is required in order to allow a sliding rail to be mounted in the nacelle in a manner which is appropriate in relation to which drive train component requires movement, and in order to allow any of the drive train components to be attached to one or more sledges in order to move the drive train component.

According to a second aspect the invention provides a transportation system for use in a wind turbine according to the first aspect of the invention, the transportation system comprising:

one or more sliding rails configured to carry a drive train component during movement, and one or more sledges, each being movably connected to a sliding rail, and each being configured to be attached to a drive train component, thereby allowing the drive train component to move along the sliding rail(s), wherein each sliding rail comprises two or more rail modules being detachably connected to each other along a longitudinal direction of the sliding rail.

The transportation system according to the second aspect of the invention has already been described in detail above with reference to the first aspect of the invention. The remarks set forth above are therefore equally applicable here.

According to a third aspect the invention provides a method for unmounting a drive train component of a wind turbine comprising a tower and one or more nacelles mounted on the tower, at least one of the nacelle(s) housing one or more drive train components, the method comprising the steps of:

mounting a first rail module of one or more sliding rails on a first drive train component, attaching at least a second rail module to the first rail module, thereby forming one or more sliding rails, movably mounting at least one sledge on each sliding rail, attaching each sledge to a drive train component to be unmounted, detaching the drive train component to be unmounted from the drive train, and moving the drive train component to be unmounted along the sliding rail(s) by means of the sledge(s).

The method according to the third aspect of the invention may advantageously take place in a wind turbine according to the first aspect of the invention, using a transportation system according to the second aspect of the invention. The remarks set forth above are therefore equally applicable here.

In the method according to the third aspect of the invention, a first rail module of one or more sliding rails is initially mounted on a first drive train component. The first drive train component could, e.g., be a drive train component arranged at an end of the drive train, such as a main bearing housing.

Next, a second rail module is attached to each first rail module, in an end to end manner, the second rail module thereby forming an extension of the first rail module. In the case that the sliding rails comprise more than two rail modules, a third rail module in then attached to the second rail module, in an end to end manner, and fourth, fifth, sixth, etc. rail modules may be added in this manner, until all of the rail modules of each sliding rail have been mounted. Thereby one or more sliding rails are formed.

Next, at least one sledge is movably mounted on each sliding rail, and each sledge is attached to a drive train component to be unmounted. Thereby the drive train component is allowed to move relative to and along the sliding rails by means of the sledges, as described above.

Finally, the drive train component to be unmounted is detached from the drive train, and the drive train component is moved along the sliding rail(s) by means of the sledge(s).

The method may further comprise the step of adjusting an inclination of each sliding rail, prior to moving the drive train component to be unmounted. This may, e.g., be done in the manner described above with reference to the first aspect of the invention. According to this embodiment, it is ensured that the sliding rails are appropriately aligned with a desired direction, e.g. the direction defined by the main shaft of the wind turbine, and with respect to each other, before movement of the drive train component is commenced.

The method may further comprise the step of dismantling the sliding rail(s) when moving of the drive train component to be unmounted has been completed. According to this embodiment, the sliding rails are mounted in the nacelle in a temporary manner. Thus, the sliding rails may be present in the nacelle only while they are required in order to move a drive train component, and when they are no longer required, they are removed from the nacelle. Thereby the sliding rails only take up space inside the nacelle when they are necessary. This is possible because the sliding rails are modular, thereby allowing easy handling of the sliding rails.

According to a fourth aspect the invention provides a method for mounting a drive train component in a wind turbine comprising a tower and one or more nacelles mounted on the tower, at least one of the nacelle(s) housing one or more drive train components, the method comprising the steps of:

mounting a first rail module of one or more sliding rails on a first drive train component, attaching at least a second rail module to the first rail module, thereby forming one or more sliding rails, movably mounting at least one sledge on each sliding rail, attaching each sledge to a drive train component to be mounted, moving the drive train component to be mounted along the sliding rail(s) by means of the sledge(s), and attaching the drive train component to be mounted to another drive train component.

The method according to the fourth aspect of the invention is very similar to the method according to the third aspect of the invention, and the remarks set forth above with reference to the third aspect of the invention are therefore equally applicable here. However, the method of the fourth aspect of the invention is for mounting a drive train component in a wind turbine, whereas the method of the third aspect of the invention is for unmounting a drive train component of a wind turbine.

In the method according to the fourth aspect of the invention, rail modules are initially mounted in the nacelle in the manner described above with reference to the third aspect of the invention, thereby forming one or more sliding rails. Next, at least one sledge is mounted on each sliding rail, and each sledge is attached to a drive train component to be mounted, essentially in the manner described above with reference to the third aspect of the invention.

Next, the drive train component to be mounted is moved along the sliding rail(s) by means of the sledge(s). The drive train component is preferably moved in a direction towards another drive train component forming part of the drive train of the wind turbine.

Finally, the drive train component to be mounted is attached to another drive train component.

The method may further comprise the step of adjusting an orientation of the drive train component to be mounted relative to a main shaft of the wind turbine prior to attaching the drive train component to be mounted to another drive train component. This could, e.g., be done by means of the sledges, in the manner described above with reference to the first aspect of the invention. According to this embodiment, it is ensured that the drive train component is appropriately aligned with respect to the rest of the drive train before it is attached thereto. Thereby damage to the drive train components due to misalignment is avoided.

BRIEF DESCRIPTION OF THE DRAWINGS

The invention will now be described in further detail with reference to the accompanying drawings in which.

DETAILED DESCRIPTION OF THE DRAWINGS

Figure 1:
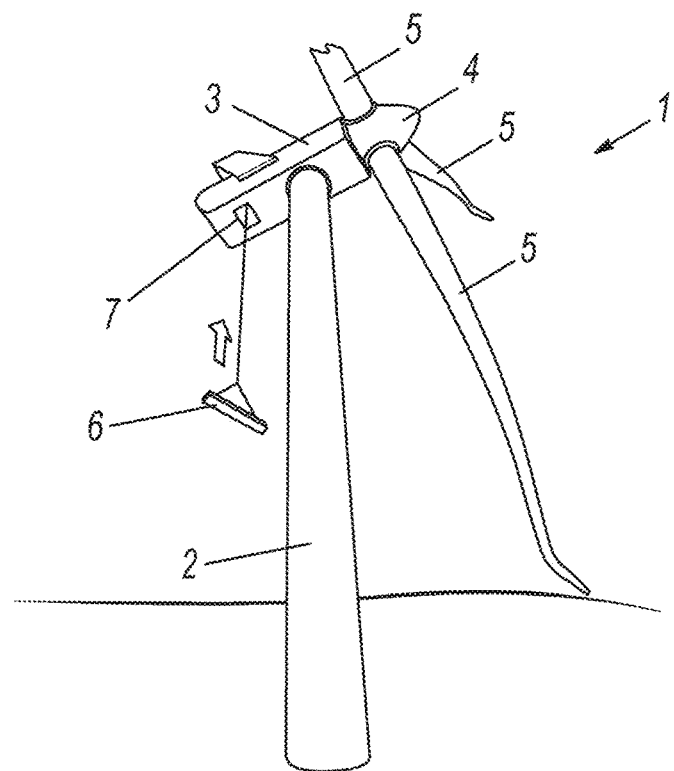
FIGS. 1-29 illustrate a wind turbine and a method according to an embodiment of the invention.

FIG. 1 is a perspective view of a single rotor wind turbine 1 according to an embodiment of the invention. The wind turbine 1 comprises a tower 2 and a nacelle 3 mounted on the tower 2. The wind turbine 1 further comprises a rotor 4 carrying three wind turbine blades 5. In FIG. 1 a rail module 6 is in the process of being hoisted towards the nacelle 3 in order to allow the rail module 6 to pass through a hatch 7 formed in a lower part of the nacelle 3. The rail module 6 may, e.g., be hoisted by means of an onboard crane (not visible) arranged in the nacelle 3.

Figure 2:
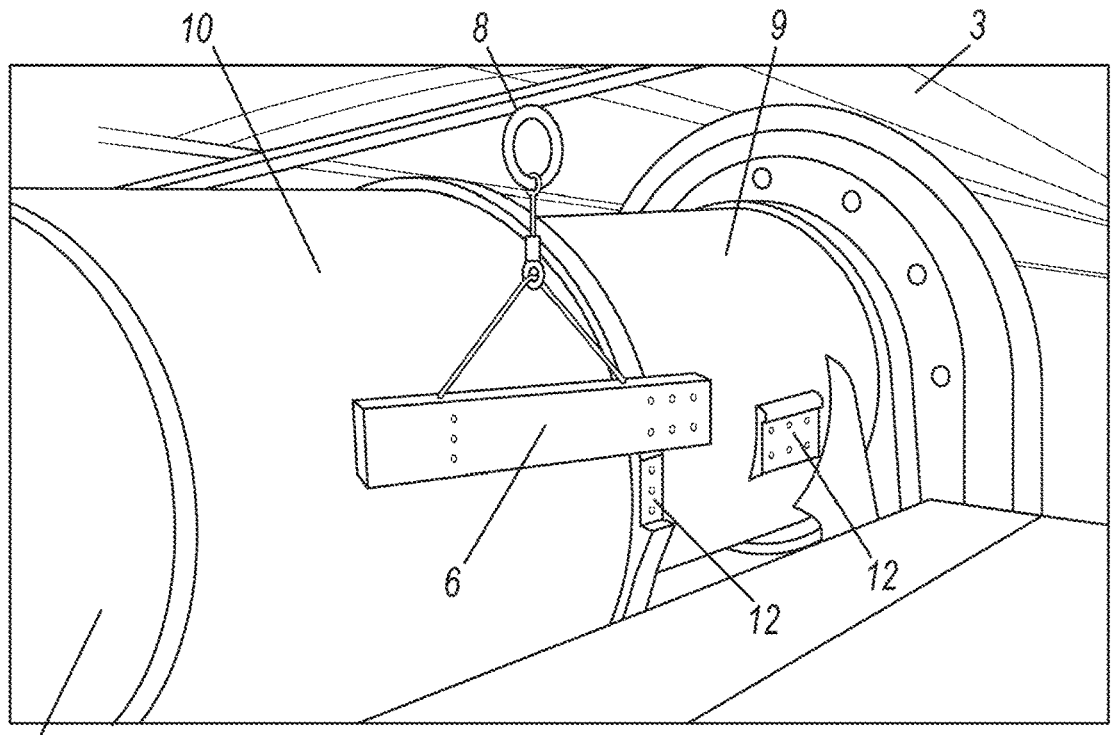

In FIG. 2 the rail module 6 has been hoisted to the nacelle 3, and is now being handled inside the nacelle 3 by means of an onboard crane 8. In particular, the rail module 6 is being moved along a drive train comprising a number of drive train components in the form of a main bearing housing 9, a gearbox 10 and a generator 11. The main bearing housing 9 houses a main bearing which rotatably supports the main shaft of the wind turbine, and the main shaft. The gearbox 10 houses a gear system.

The main bearing housing 9 is provided with interface portions 12 configured to have a rail module 6 attached thereto. This allows the rail module 6 to be mounted on the main bearing housing 9 accurately at a desired position and with a desired orientation or inclination with respect to the main bearing housing 9. Furthermore, it allows easy attachment of the rail module 6 to the main bearing housing 9.

It should be noted that the gearbox 10 and/or the generator 11 could be provided with similar interface portions, thereby allowing a rail module 6 to be attached to the gearbox 10 or to the generator 11. It is further noted that the interface portions 12 may also be used for attaching a sledge to one of the drive train components 9, 10, 11 in order to move the drive train component 9, 10, 11. This will be described in further detail below. In this case it is only necessary to provide a given drive train component 9, 10, 11 with a single kind of interface portion 12 in order to allow easy attachment of a rail module 6 as well as easy attachment of a sledge to the drive train component 9, 10, 11.

Figure 3:
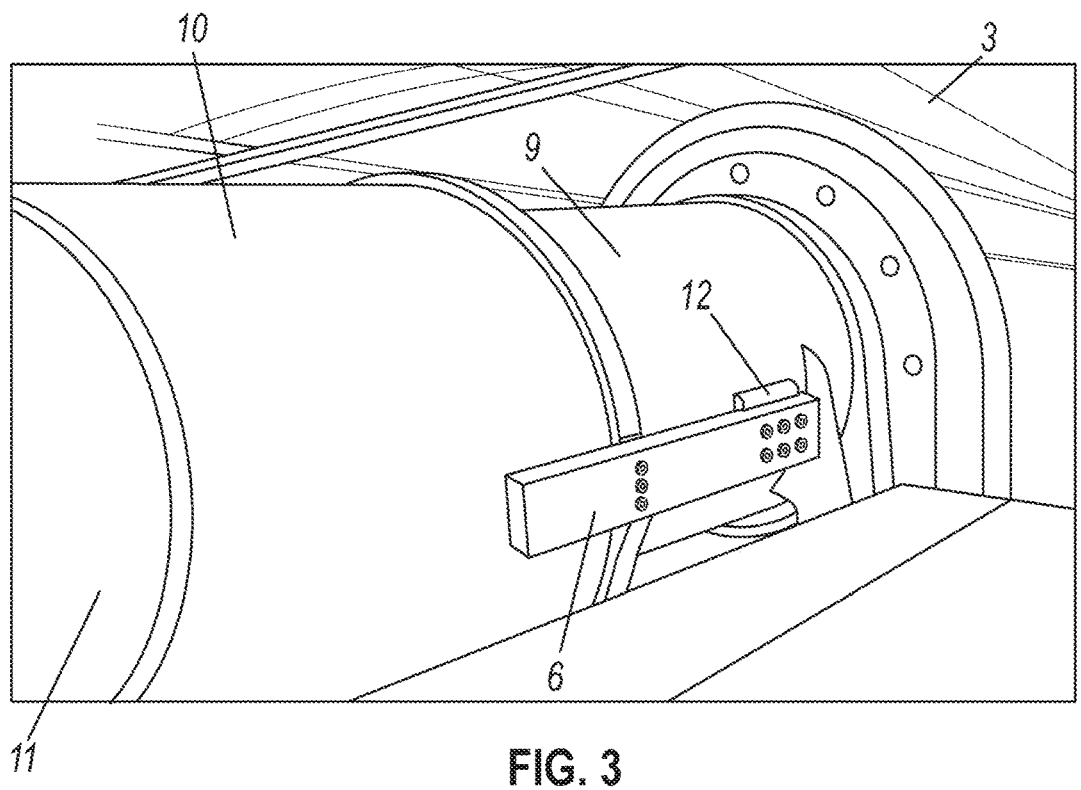

In FIG. 3 the rail module 6 has been bolted to the main bearing housing 9 at the interface portions 12. It can be seen that the orientation or inclination of the rail module 6 is determined by the position and design of the interface portions 12. It can also be seen that the orientation or inclination of the rail module 6 is such that it extends along a direction which is substantially parallel to a longitudinal direction of the drive train, i.e. parallel to a direction defined by the main shaft of the wind turbine.

Figure 4:
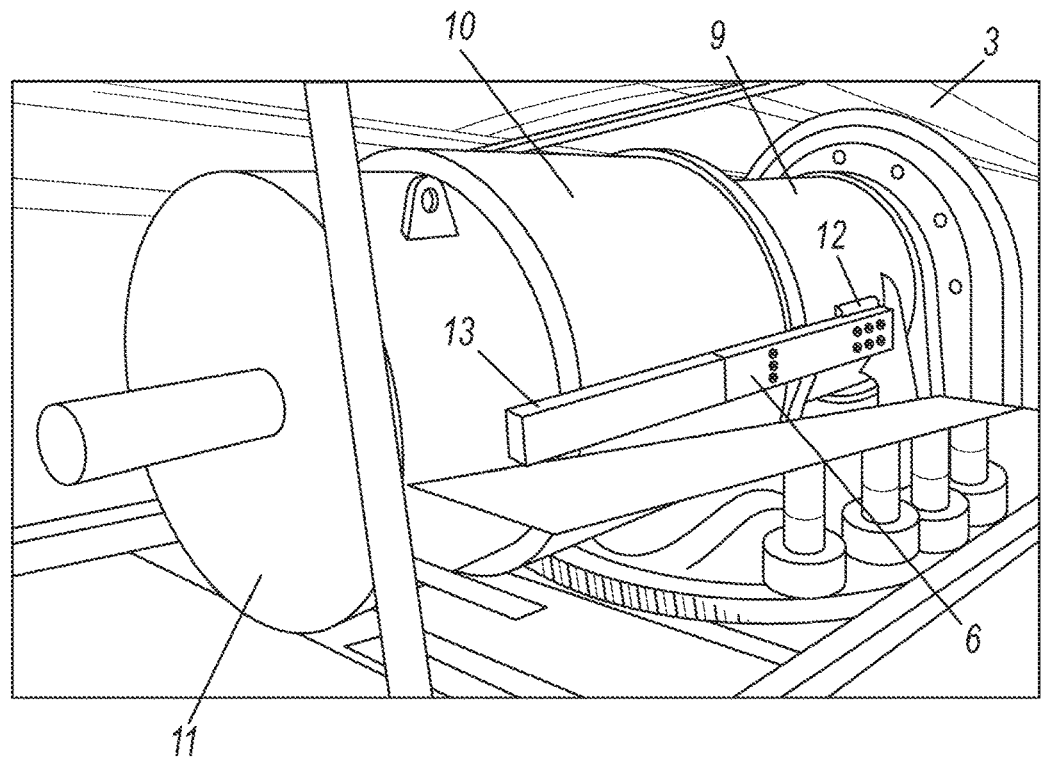

In FIG. 4 a second rail module 13 has been hoisted into the nacelle 3 and attached to an end part of the first rail module 6, which is illustrated in FIG. 3. Accordingly, the second rail module 13 is arranged in continuation of the first rail module 6, and the rail modules 6, 13 extend along the same direction.

The second rail module 13 is only attached to the first rail module 6, i.e. the second rail module 13 is not attached to the gearbox 10 or the generator 11. Thereby it is possible for the gearbox 10 and the generator 11 to move relative to the rail modules 6, 13. This will be described in further detail below.

Figure 5:
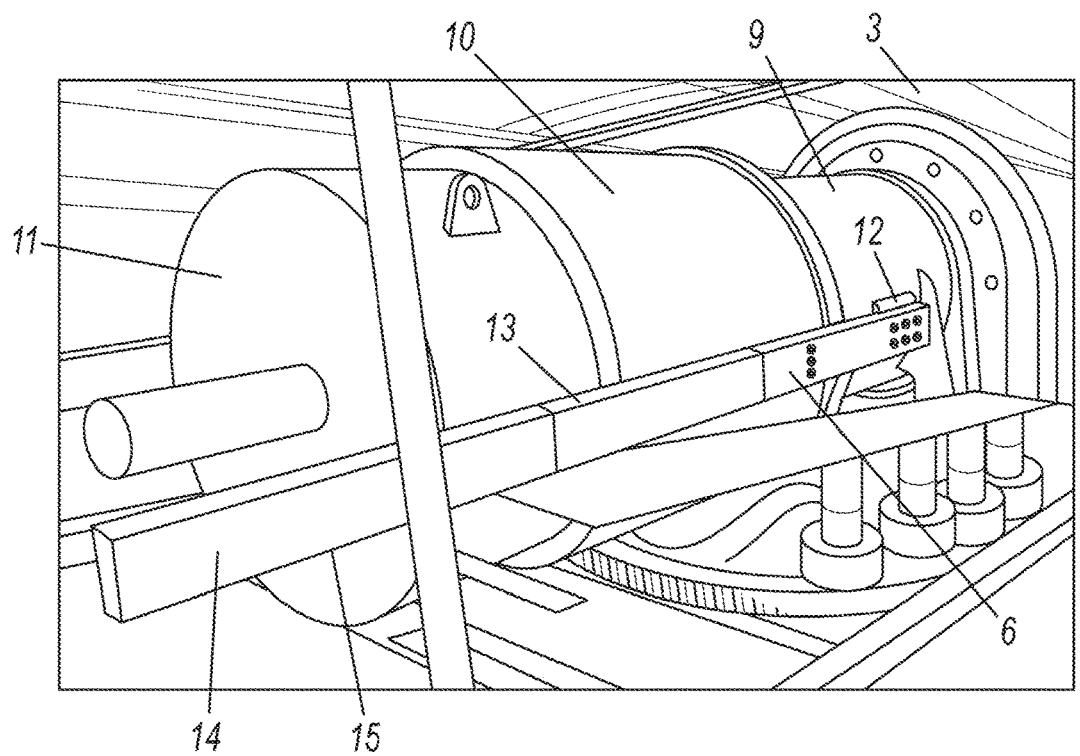

In FIG. 5 a third rail module 14 has been hoisted into the nacelle 3 and attached to an end part of the second rail module 13, in a similar manner as the second rail module 13 is attached to the first rail module 6. The three rail modules 6, 13, 14 thereby form a modular sliding rail 15 extending along a direction which is defined by the main shaft of the wind turbine.

It is an advantage that the sliding rail 15 is modular, because this allows the rail modules 6, 13, 14 to be provided and handled separately, and assembled to form the sliding rail 15 inside the nacelle 3. For instance, it is thereby possible to pass the rail modules 6, 13, 14 through the service hatch 7 of the nacelle 3, and the rail modules 6, 13, 14 can be handled by the onboard crane 8. Yet, it is still possible to form long sliding rails 15 capable of handling large and heavy drive train components 9, 10, 11, in a manner which will be described below.

Figure 6:
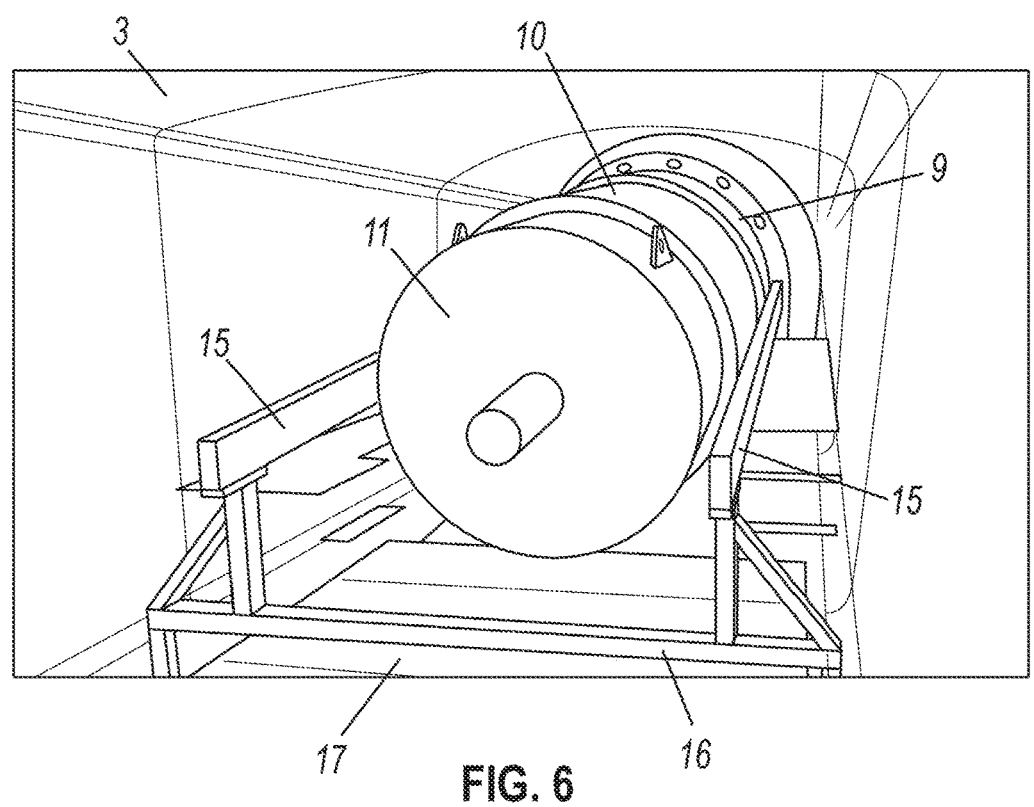

In FIG. 6 it can be seen that a corresponding modular sliding rail 15 has been assembled on the opposite side of the drive train. Thereby the sliding rails 15 extend in parallel on opposite sides of the drive train components 9, 10, 11, and at a level which is below the centre of gravity of the drive train components 9, 10, 11. This allows the drive train components 9, 10, 11 to be supported by the sliding rails 15 from below.

Furthermore, in FIG. 6 a support structure 16 has been arranged between a load carrying structure 17 of the nacelle 3 and end parts of the sliding rails 15 corresponding to free ends of the third rail modules 14. The support structure 16 ensures that the sliding rails 15 are supported on the load carrying structure 17 of the nacelle 3. Accordingly, the sliding rails 15 are each supported at one end by the connection between the first rail module 6 and the interface portion 12 of the main bearing housing 9, and at the opposite end by the support structure 16.

Figure 7:
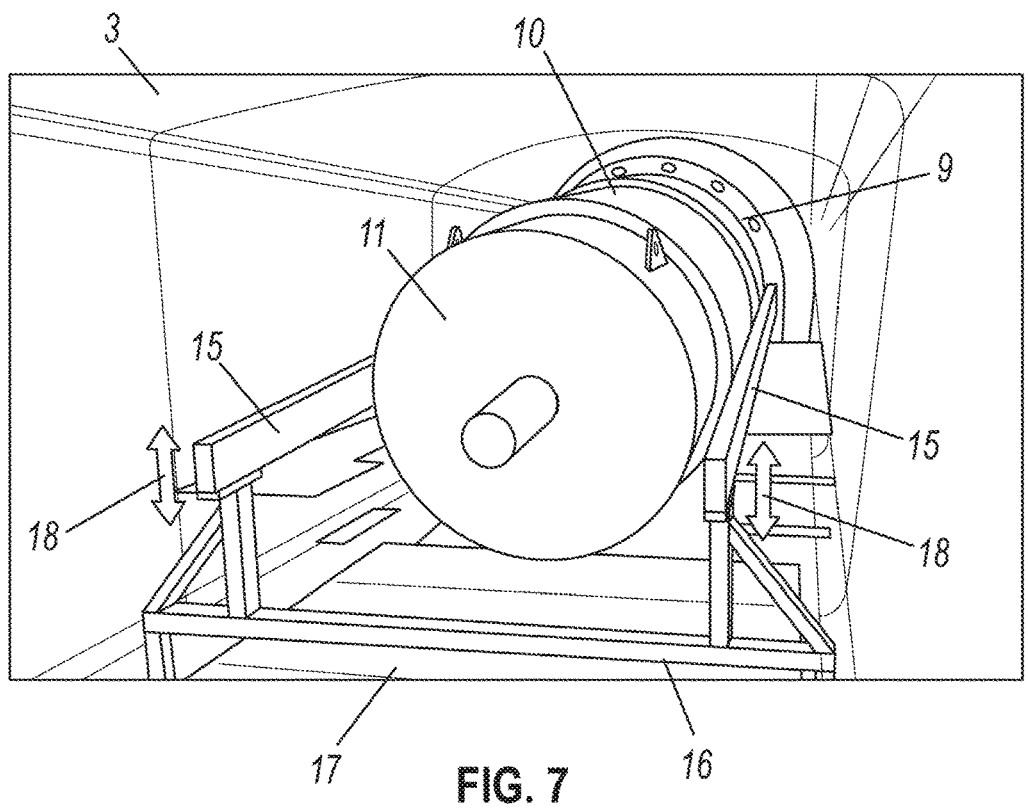

In FIG. 7 the inclination of the sliding rails 15 is adjusted as indicated by arrows 18. This could, e.g., be in order to ensure that the sliding rails 15 are accurately aligned with the direction defined by the main shaft of the wind turbine. The adjustment of the inclination could, e.g., take place manually, such as by rotating a threaded rod engaging a mating inner thread. As an alternative, the adjustment mechanism may comprise hydraulic pistons, and the adjustment may be performed by operating the hydraulic pistons.

Figure 8:
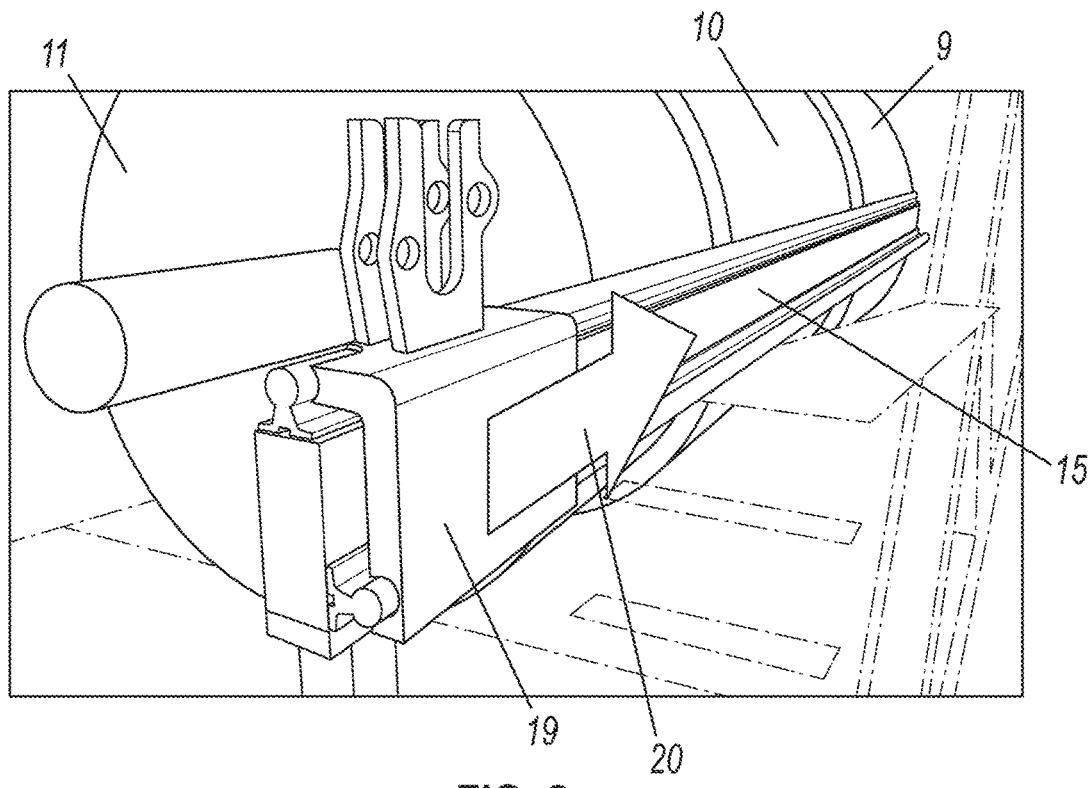

In FIG. 8 a part of a sledge 19 has been mounted on one of the sliding rails 15. Arrow 20 indicates that the sledge 19 can move along the length of the sliding rail 15, and that the sledge 19 has been pushed onto the sliding rail 15 at its free end. The sledge 19 is provided with a holding part 57 being configured to hold a relative position between a guiding part and a mating part of the sledge 19.

Figure 9:
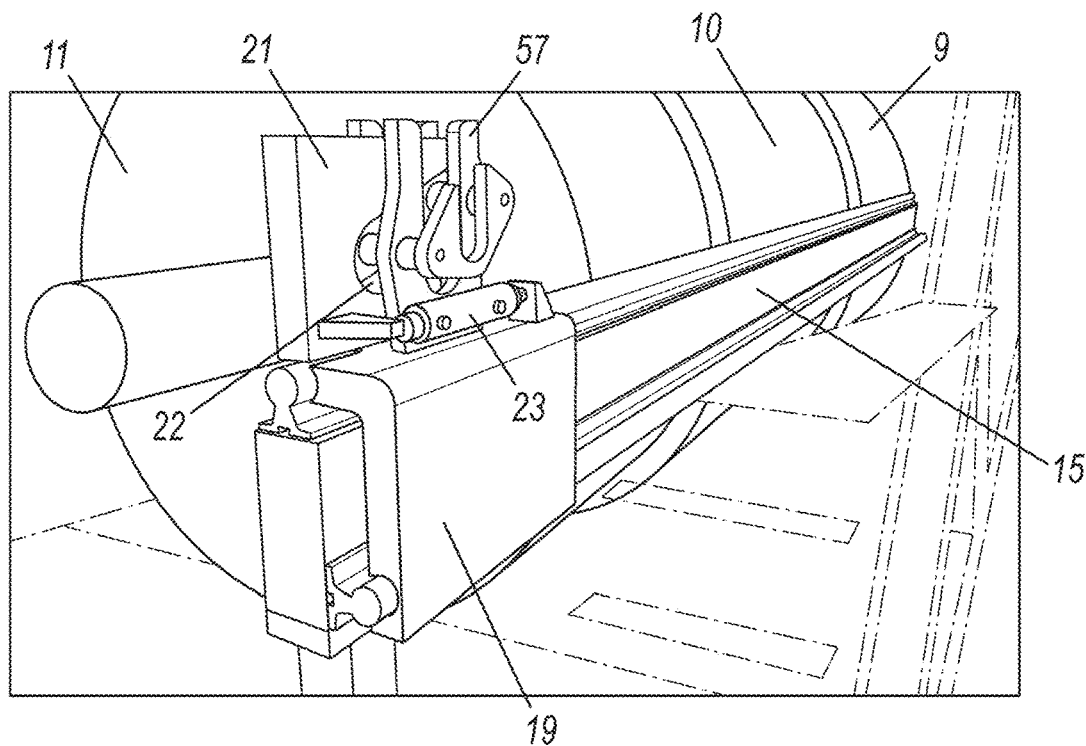

In FIG. 9 a guiding part 21 has been mounted on the sledge 19, the guiding part 21 being provided with a guiding track 22. The guiding track 22 is inclined with respect to the longitudinal direction of the sliding rail 15. This will be described in further detail below. The guiding part 21 can be moved with respect to the sledge 19 by means of piston 23.

Figure 10:
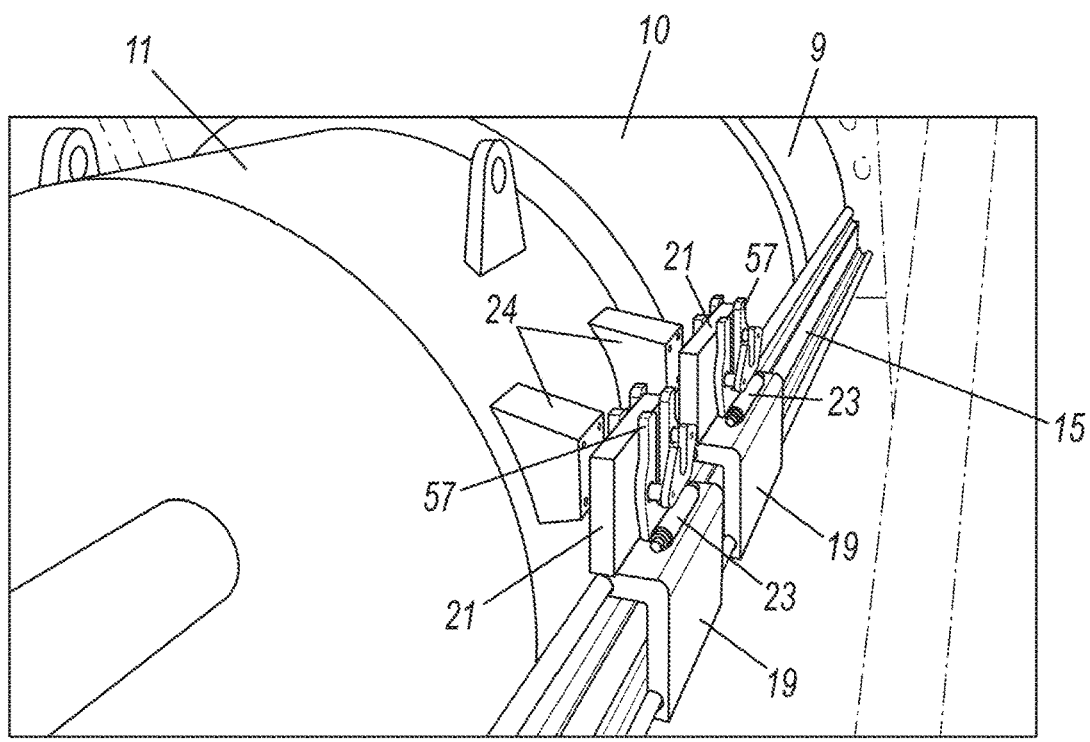

In FIG. 10 an additional sledge 19, including a guiding part 21, has been mounted movably on the sliding rail 15. Furthermore, two interface portions 24 have been attached to the generator 11, and the sledges 19 have been moved along the sliding rail 15 to positions corresponding to the positions of the interface portions 24.

Figure 11:
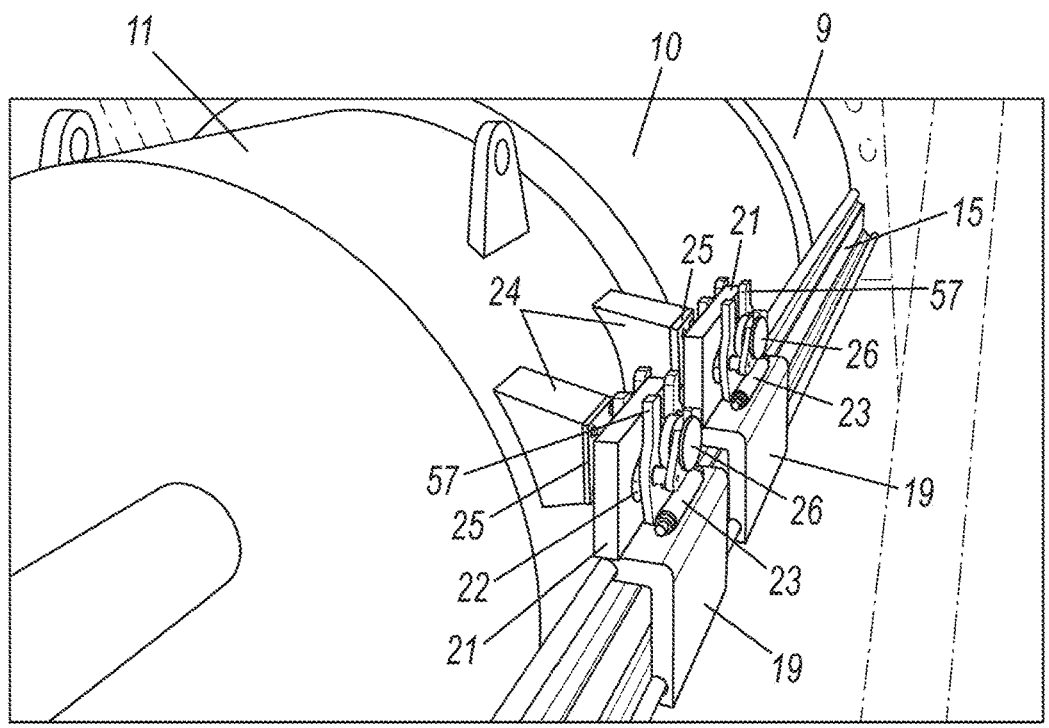

In FIG. 11 a mating part 25 has been mounted on each of the interface portions 24. Each mating part 25 is provided with a protruding part 26 which is arranged in engagement with the guiding track 22 of the guiding part 21 of one of the sledges 19. Since the mating parts 25 are attached to the interface portions 24 they are fixed relative to the generator 11.

When the guiding part 21 of one of the sledges 19 is moved relative to the sledge 19, in particular relative to the holding part 57, by means of the piston 23, the guiding part 21 will also move relative to the corresponding mating part 25. This will cause a corresponding relative movement between the guiding track 22 and the protruding part 26 engaging the guiding track 22. This will cause the protruding part 26 to follow the path defined by the guiding track 22. Since the guiding track 22 is inclined relative to the longitudinal direction of the sliding rail 15, the movement of the protruding part 26 along the guiding track 22 differs from a linear movement along the sliding rail 15. Thereby the orientation of the generator 11 can be adjusted by performing relative movements between the guiding parts 21 and the sledges 19. The holding part 57 ensures that no relative movements between the guiding part 21 and the mating part 25 take place whenever such relative movements are not desired. Thereby it is ensured that a given relative position between the guiding part 21 and the mating part 25, and thereby a given orientation if the generator 11, can be maintained.

If the guiding part 21 of one of the sledges 19 shown in FIG. 11 is moved, while the other one is not moved or is moved in an opposite direction, then the generator 11 will be tilted in such a manner that a rotational axis defined by the generator 11 is tilted relative to the direction defined by the main shaft of the wind turbine.

If the guiding parts 21 of both of the sledges 19 shown in FIG. 11 are moved in the same direction while the guiding part 21 of one or more similar sledges arranged on the opposite sliding rail 15 (not visible in FIG. 11) is not moved or is moved in an opposite direction, then the generator 11 will be rotated about an axis defined by the main shaft of the wind turbine.

If the guiding parts 21 of all of the sledges 19 are moved in the same direction, the generator 11 will be moved in a translational manner in an upwards or downwards direction.

Accordingly, the generator 11, or one of the other drive train components 9, 10, can be adjusted with respect to six degrees of freedom by means of only three sledges 19, two of the sledges 19 being arranged on one side of the drive train component 9, 10, 11, as shown in FIG. 11, and the third being arranged on the opposite side of the drive train components 9, 10, 11. This is obtained in an easy and uncomplicated manner by means of the guiding tracks 22 and the protruding parts 26 arranged in engagement with the guiding tracks 22.

Figure 12:
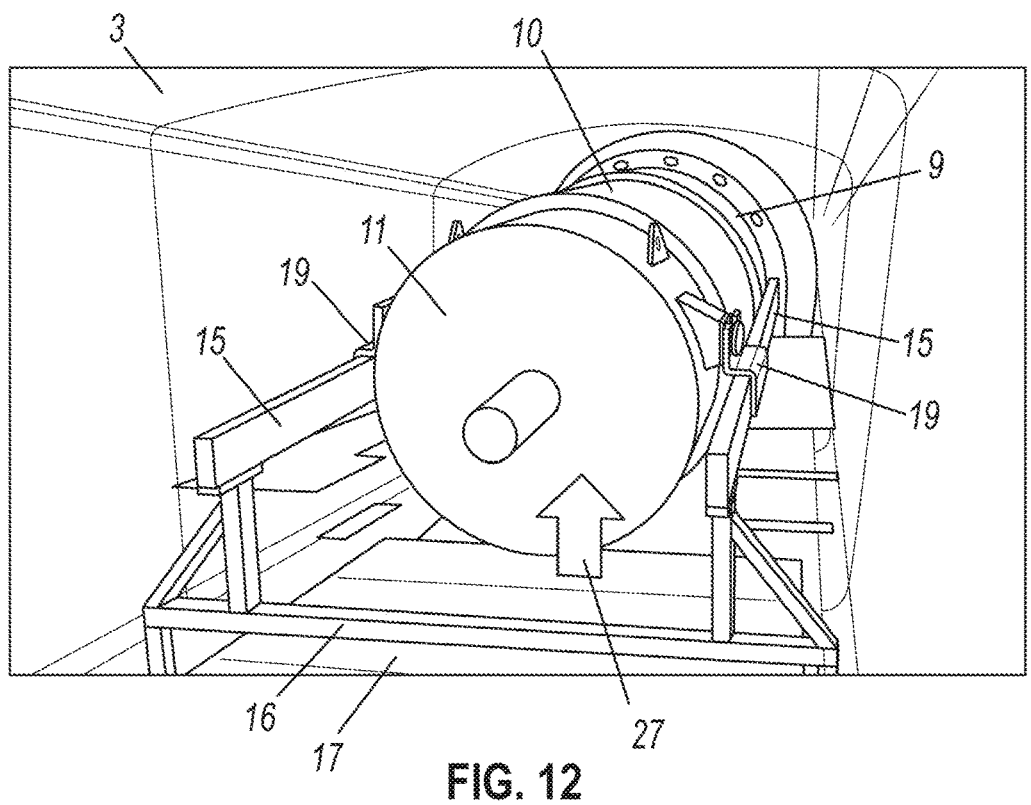

FIG. 12 illustrates part of the floor 17 of the nacelle 3 being removed, as indicated by arrow 27. This is in order to allow drive train components 9, 10, 11 to pass through a lower part of the nacelle 3.

Figure 13:
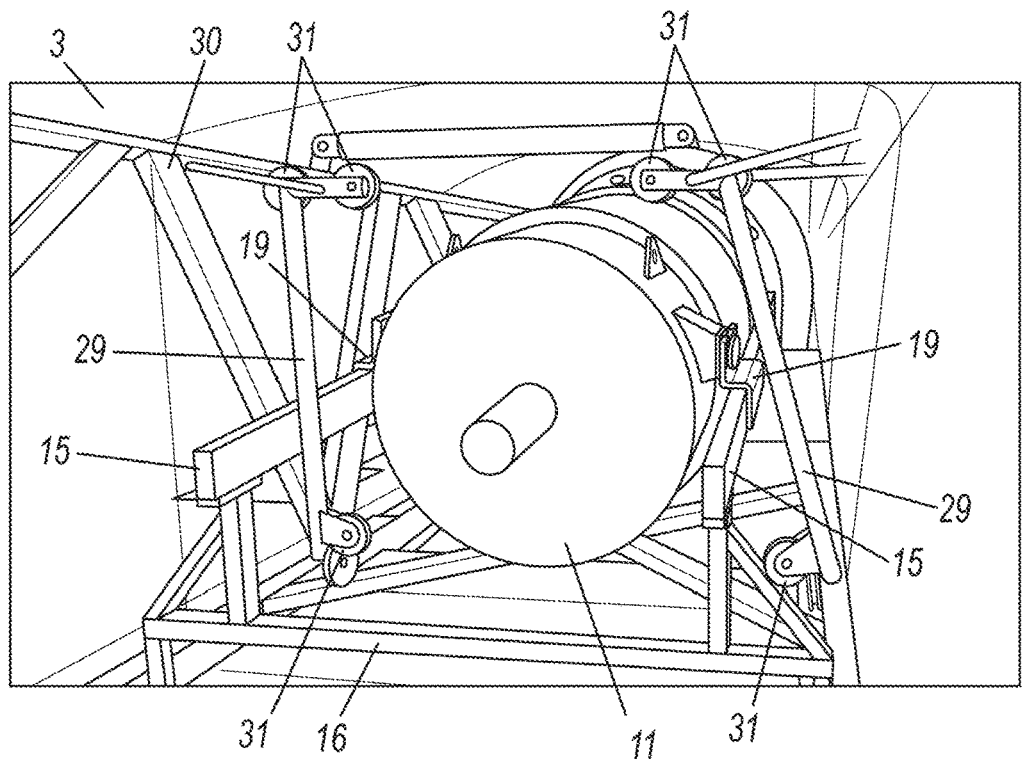

In FIG. 13, two cable guiding structures 29 have been mounted on a load carrying frame 30 of the nacelle 3. Each cable guiding structure 29 is provided with three pulleys 31 arranged for receiving and guiding a cable.

Figure 14:
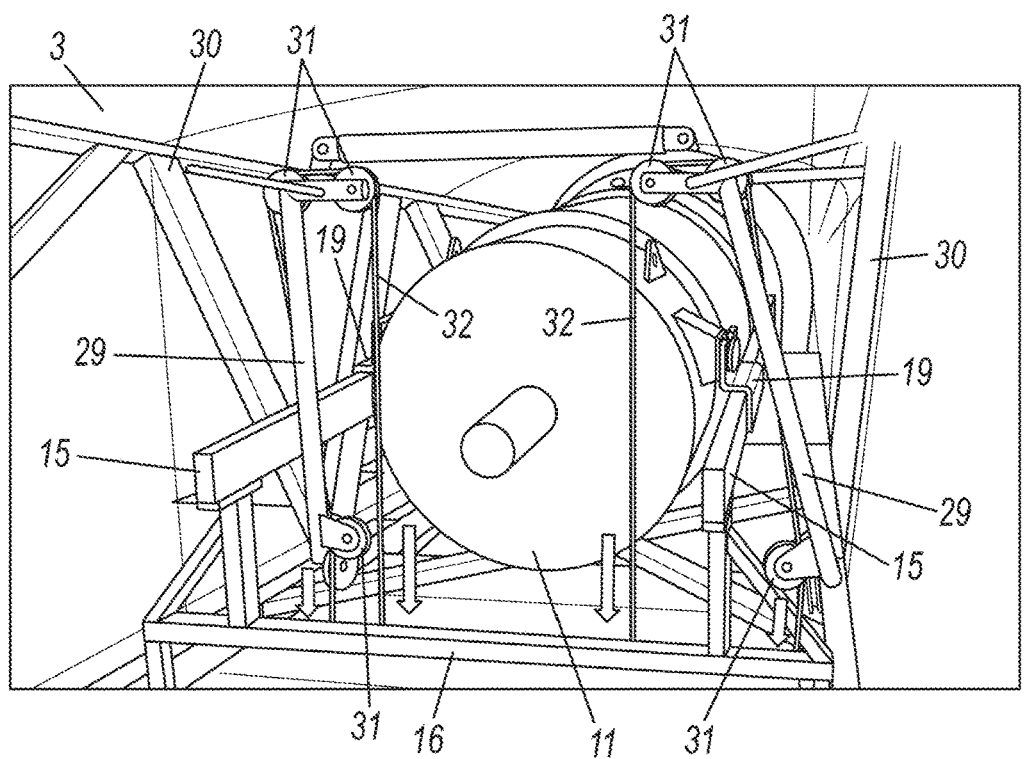

In FIG. 14, cables 32 have been mounted on the pulleys 31 of the cable guiding structures 29, and are lowered through the lower part of the nacelle 3. The cables 32 could, e.g., be in the form of tag lines. Furthermore, one end of each cable 32 may be connected to a hoisting mechanism, such as a winch.

Figure 15:
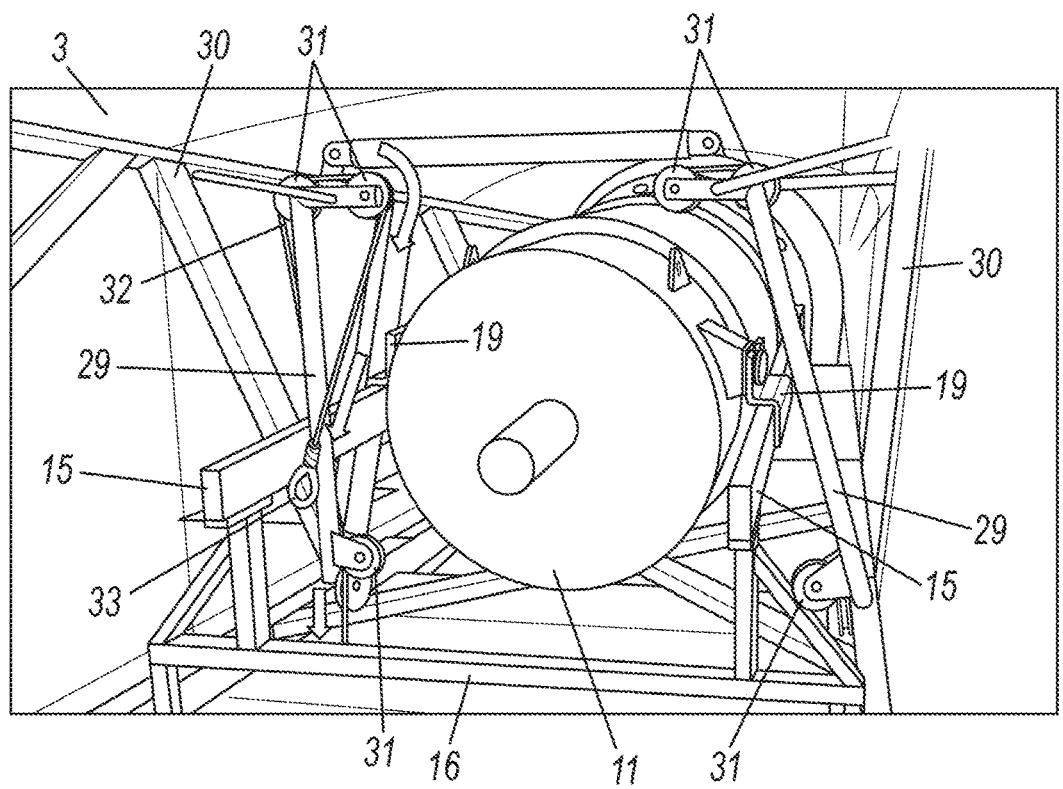

In FIG. 15 one of the cables 32 has been connected to a hoisting mechanism at one end and to an eyelet 33 formed on the cable guiding structure 29 at the other end. This allows the hoisting mechanism to hoist itself towards the nacelle 3. This will be described in further detail below.

Figure 16:
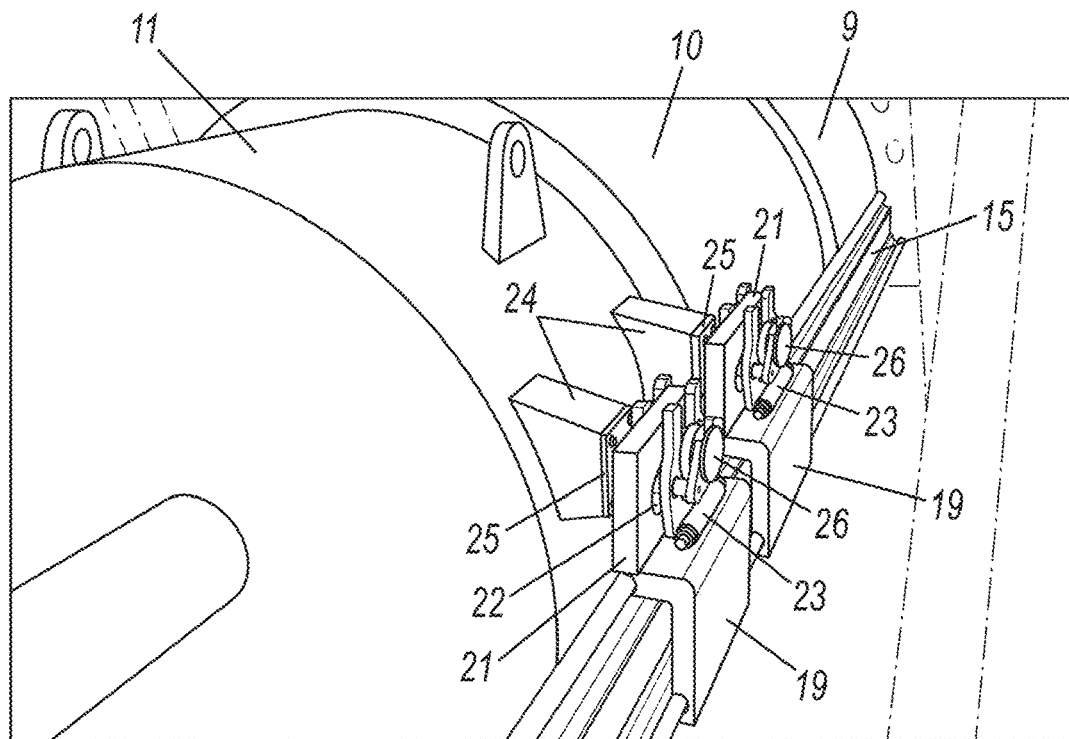

FIG. 16 illustrates a situation similar to the situation illustrated in FIG. 11. However, in FIG. 16 the generator 11 has been detached from the gearbox 10, and thereby from the rest of the drive train. Accordingly, the generator 11 is now carried by the sledges 19 and the sliding rail 15, and it is possible to move the generator 11 relative to the main bearing housing 9 and the gearbox 10, by means of the sledges 19.

Figure 17:
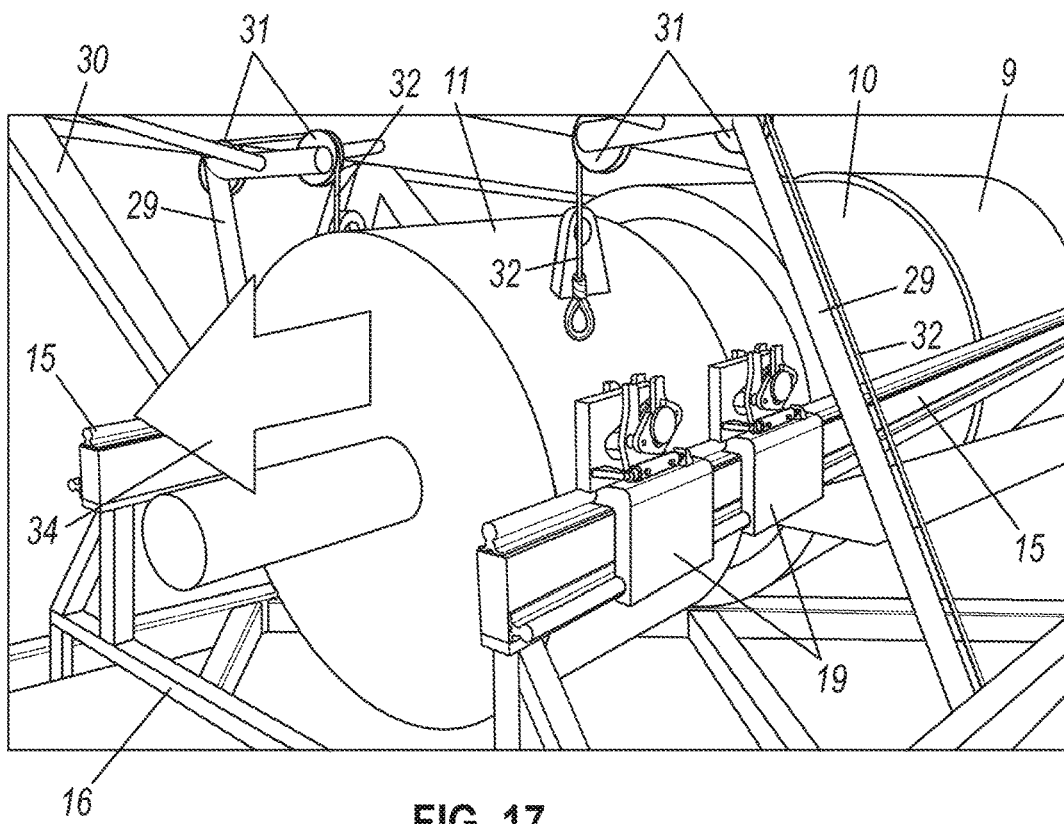

In FIG. 17 the generator 11 is in the process of being moved away from the main bearing housing 9 and the gearbox 10 as indicated by arrow 34. The generator 11 is moved along the sliding rails 15 due to the sledges 19 sliding along the sliding rails 15. Since the sliding rails 15 are essentially aligned with a direction defined by the main shaft of the wind turbine, the generator 11 is moved essentially along this direction.

Figure 18:
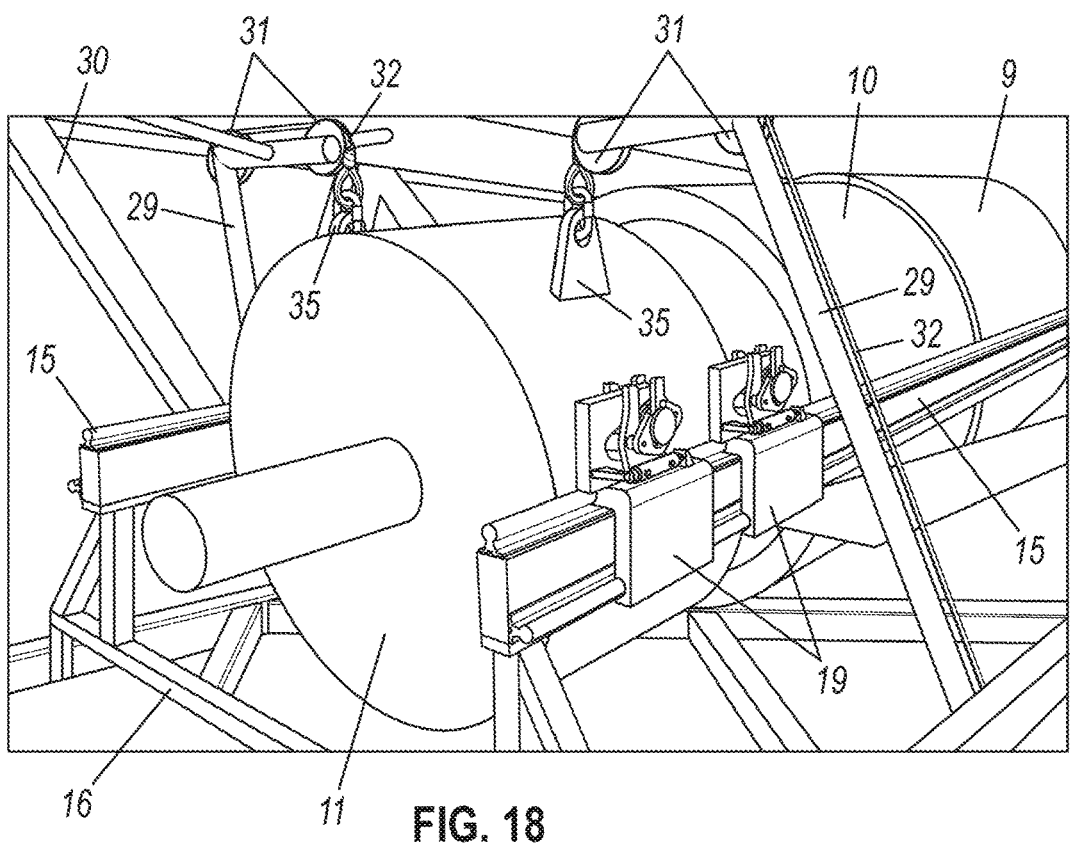

In FIG. 18 the movement of the generator 11 along the sliding rails 15 has been completed, and the generator 11 has thereby been moved to a position where it is free of the gearbox 10, i.e. it is no longer connected to the rest of the drive train. Furthermore, the cables 32 have been connected to the generator 11 via connecting parts 35. Thereby the generator 11 is connected to the hoisting mechanism, via the cables 32.

Figure 19:
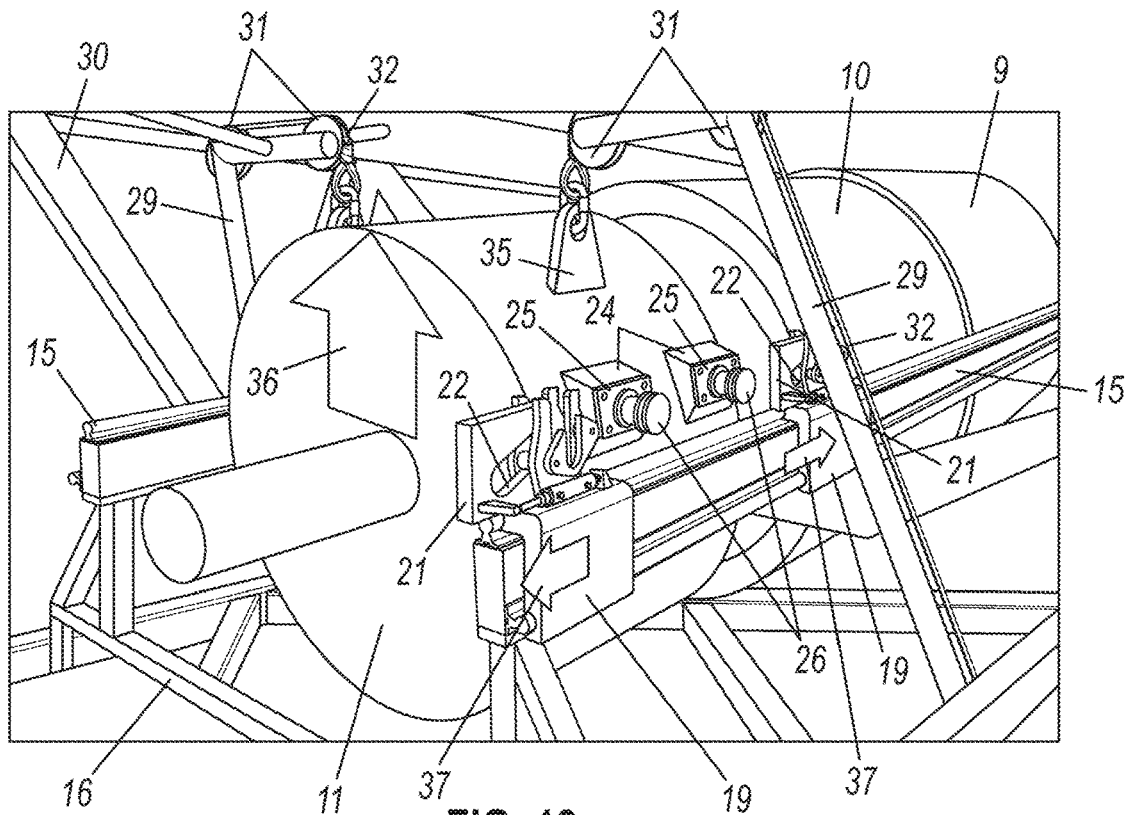

In FIG. 19 the generator 11 has been lifted upwards, as indicated by arrow 36, by means of the hoisting mechanism and the cables 32. Thereby the protruding part 26 of the mating part 25 of each sledge 19 has been moved out of engagement with the guiding track 22 of the guiding part 21. Thus, the generator 11, with the mating parts 25 attached thereto, is now free to move relative to the guiding parts 21. Accordingly, the sledges 19, along with the guiding parts 21, have been moved along the sliding rails 15, away from the mating parts 25, as indicated by arrows 37.

Figure 20:
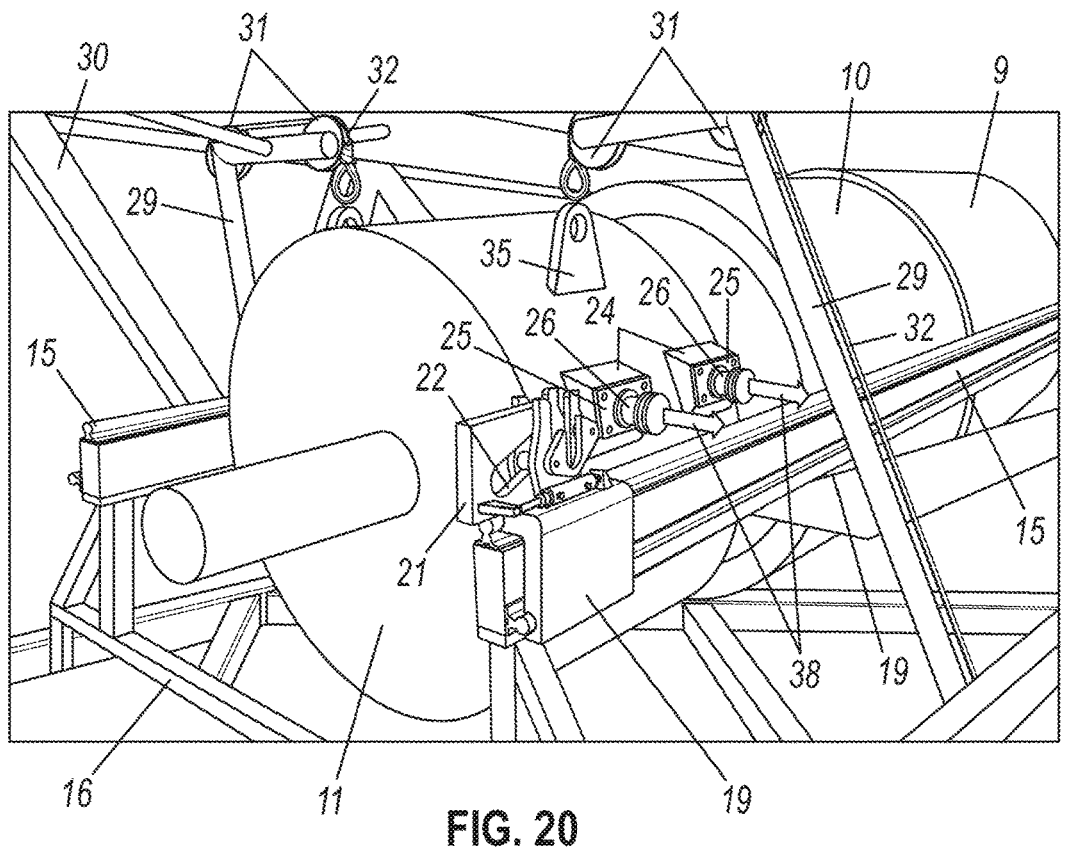

In FIG. 20 the mating parts 25 are in the process of being removed from the interface portions 24, as indicated by arrows 38. This will allow the generator 11 to pass the sliding rails 15 in a downwards direction.

Figure 21:
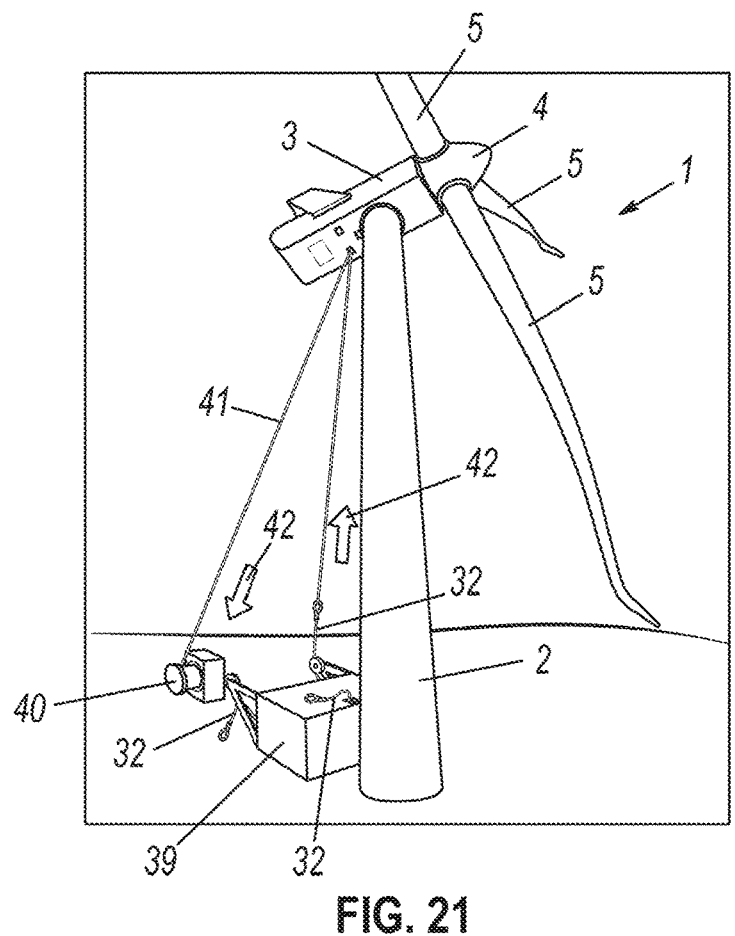

FIG. 21 is a perspective view of the wind turbine 1 which was also illustrated in FIG. 1. A container 39 accommodating a hoisting mechanism (not visible) is arranged on the ground next to the tower 2, i.e. at the base of the wind turbine 1. An anchoring point 40 is also provided on the ground in the vicinity of the wind turbine 1. A tag line 41 interconnects a cable 32, which is attached to the hoisting mechanism inside the container 39, and the anchoring point 40, via a connecting point in the nacelle 3. The tag line 41 could, e.g., have been lowered from the nacelle 3. The connecting point could, e.g., form part of a cable guiding structure as illustrated in FIGS. 13-20 and described above.

Using the tag line 41, the cable 32 is hoisted towards the nacelle 3, as indicated by arrows 42. When the cable 32 has been hoisted to the nacelle 3, it may be attached to a cable guiding structure, as illustrated in FIG. 15 and described above. Thereby the hoisting mechanism accommodated in the container 39 is connected to the cable guiding structure, via the cable 32.

Figure 22:
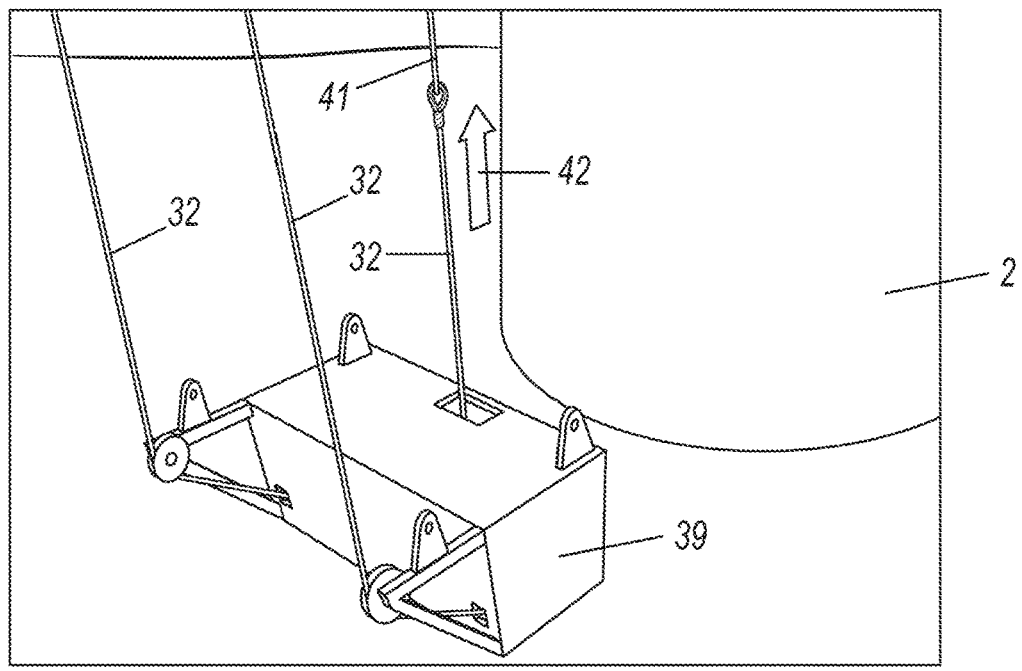

FIG. 22 shows the container 39 where two cables 32 have been hoisted to the nacelle and a third cable 32 is in the process of being hoisted towards the nacelle. When hoisting of the third cable 32 has been completed, the container 39 will be connected to the nacelle via all three cables 32, and the container 39 is thereby ready to be hoisted towards the nacelle by means of the hoisting mechanism accommodated in the container 39.

Figure 23:
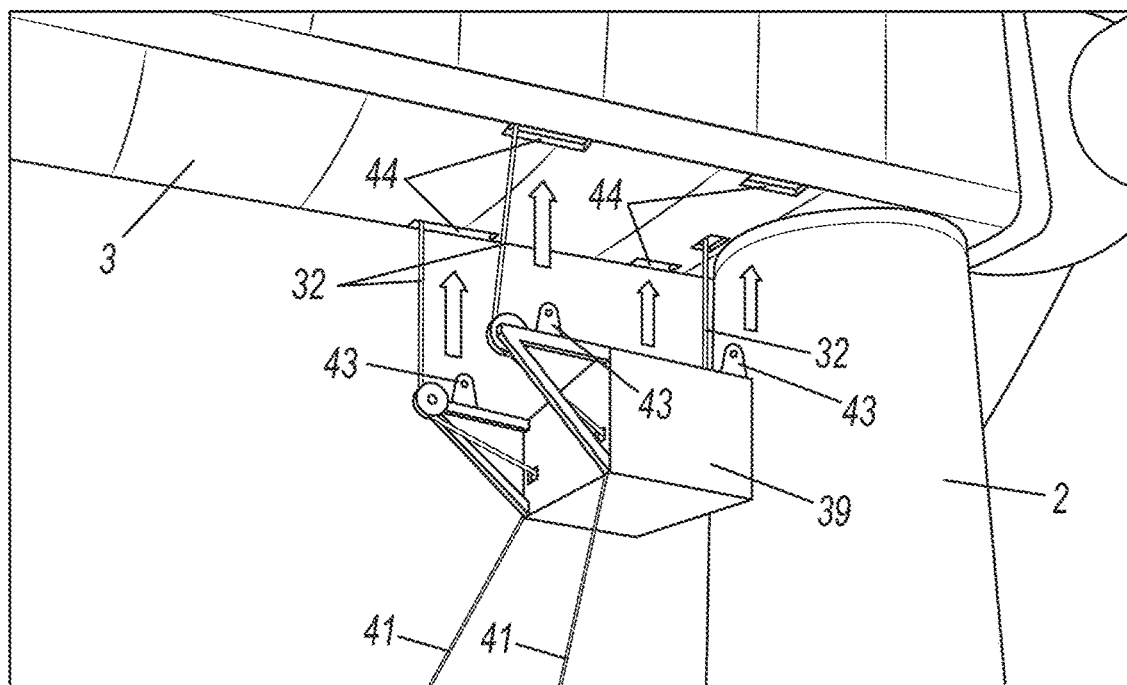

In FIG. 23 the container 39 is in the process of being hoisted towards the nacelle 3 by means of the hoisting mechanism accommodated in the container 39 and the cables 32. In order to control the movements of the container 39 during the hoisting, two tag lines 41 are provided which connect the container 39 to anchoring points 40 on the ground.

The container 39 is hoisted towards the nacelle 3 in such a manner that mounting interfaces 43 formed on the container 39 are moved into contact with corresponding mounting interfaces 44 formed on the lower part of the nacelle 3. When the interfaces 43, 44 are moved into contact, a locking mechanism will lock the interfaces 43, 44 together, thereby attaching the container 39 to the lower part of the nacelle 3.

Figure 24:
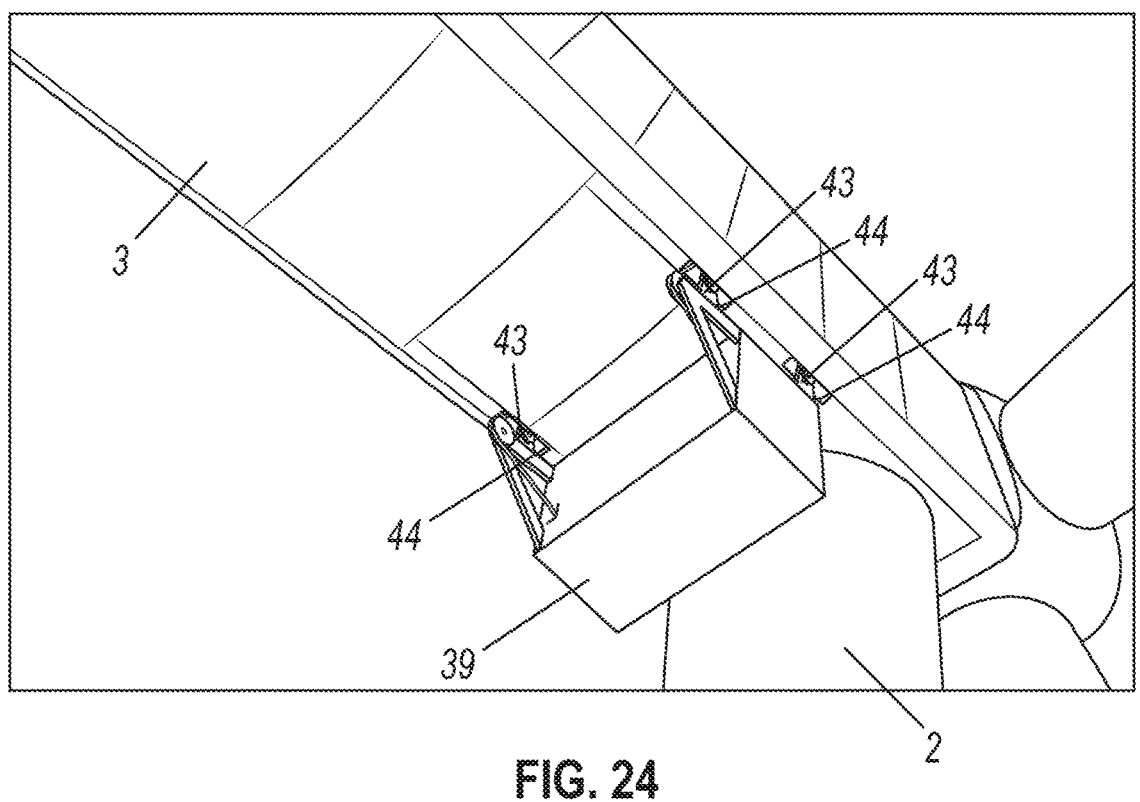

In FIG. 24 the interfaces 43, 44 have been moved into engagement, and the container 39 is thereby attached securely to the lower part of the nacelle 3. Furthermore, the tag lines have been removed.

Figure 25:
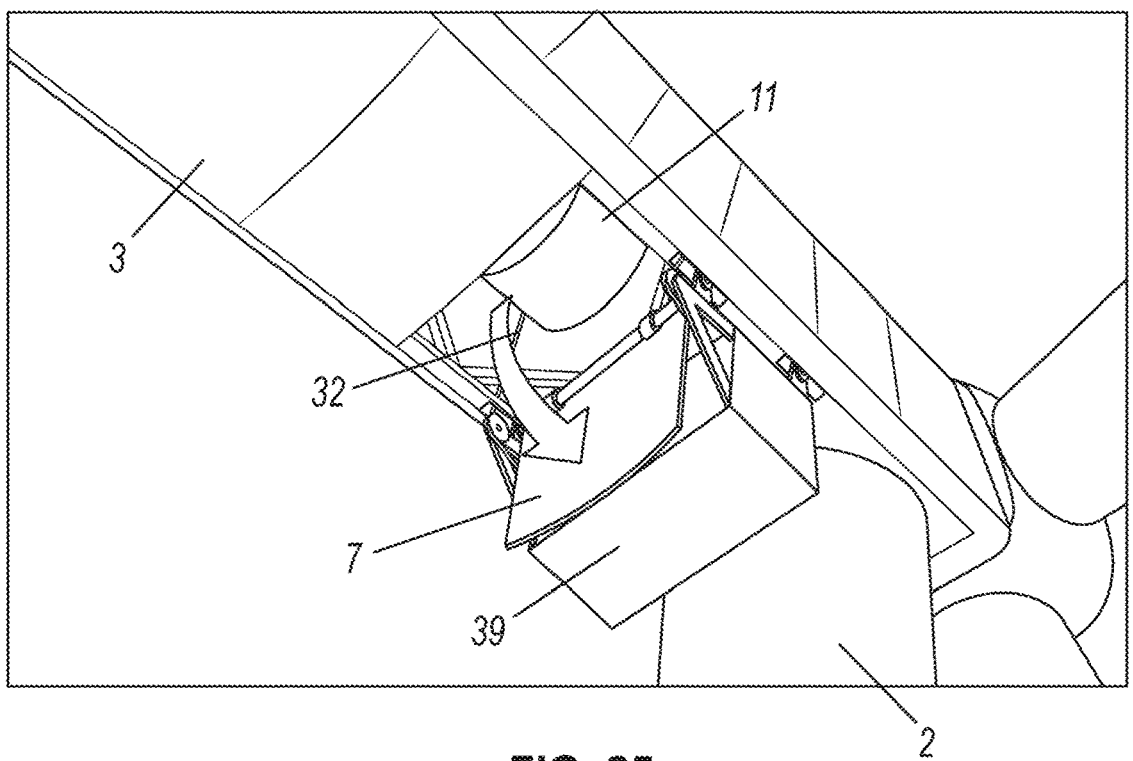

In FIG. 25 a hatch 7 formed in the lower part of the nacelle 3 has been opened, and the generator 11 can be seen through the opening which is thereby formed in the lower part of the nacelle 3. As described above, the generator 11 has been detached from the drive train and is connected to the hoisting mechanism accommodated in the container 39 via the cables 32. Thereby the generator 11 can be lowered towards the ground by means of the hoisting mechanism accommodated in the container 39. When doing so, the container 39 will stem against the lower part of the nacelle 3, and the nacelle 3 thereby performs the function of a counterweight. Accordingly, a separate counterweight is not required in order to lower the generator 11 towards the ground. This is a great advantage, because the costs involved with replacing a heavy drive train component can thereby be reduced considerably.

Figure 26:
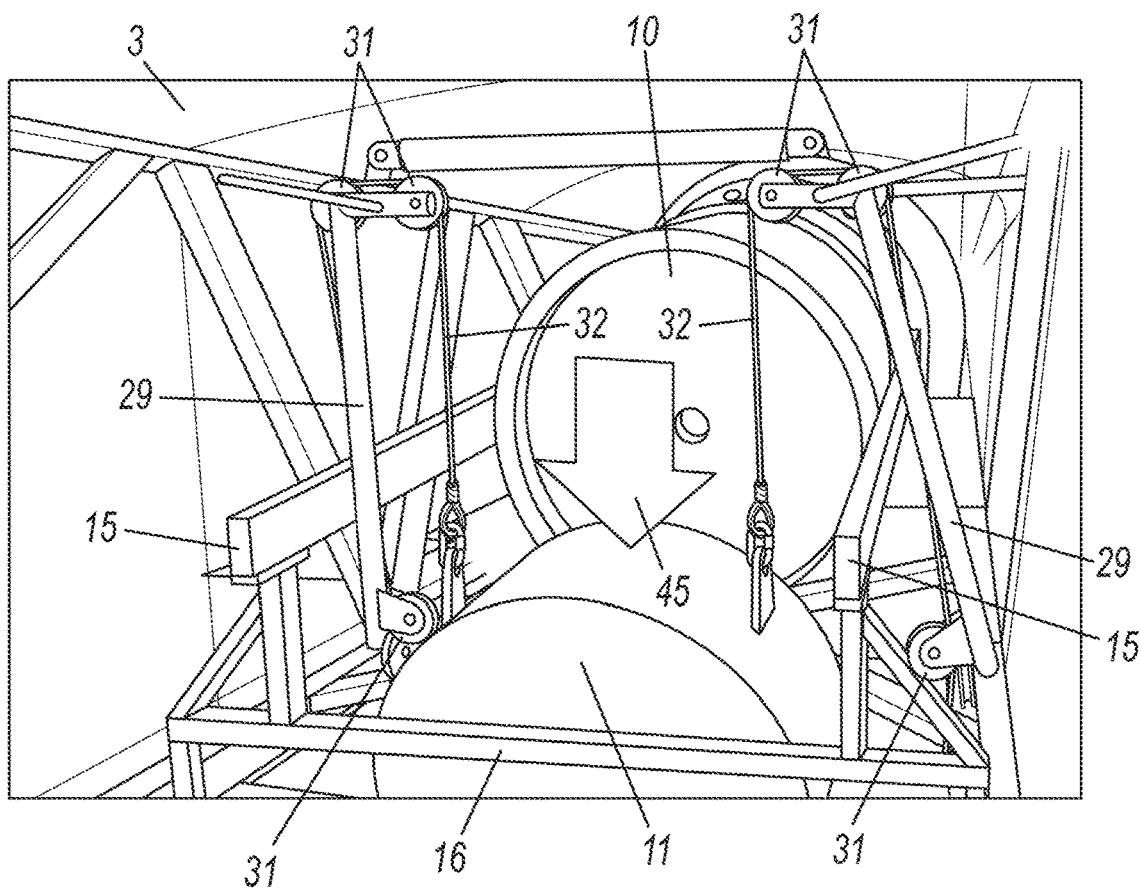

FIG. 26 illustrates the generator 11 being lowered towards the ground through the opening formed in the lower part of the nacelle 3, as indicated by arrow 45.

Figure 27:
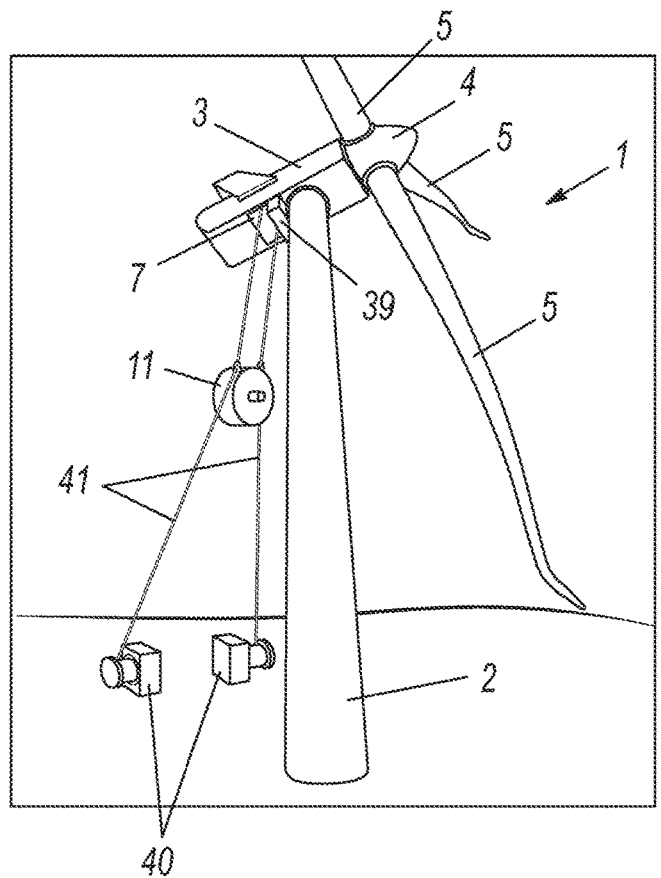

FIG. 27 shows the generator 11 being lowered towards the ground by means of the hosting mechanism accommodated in the container 39. The movement of the generator 11 is controlled by means of two tag lines 41, each being connected to an anchoring point 40 on the ground.

Figure 28:
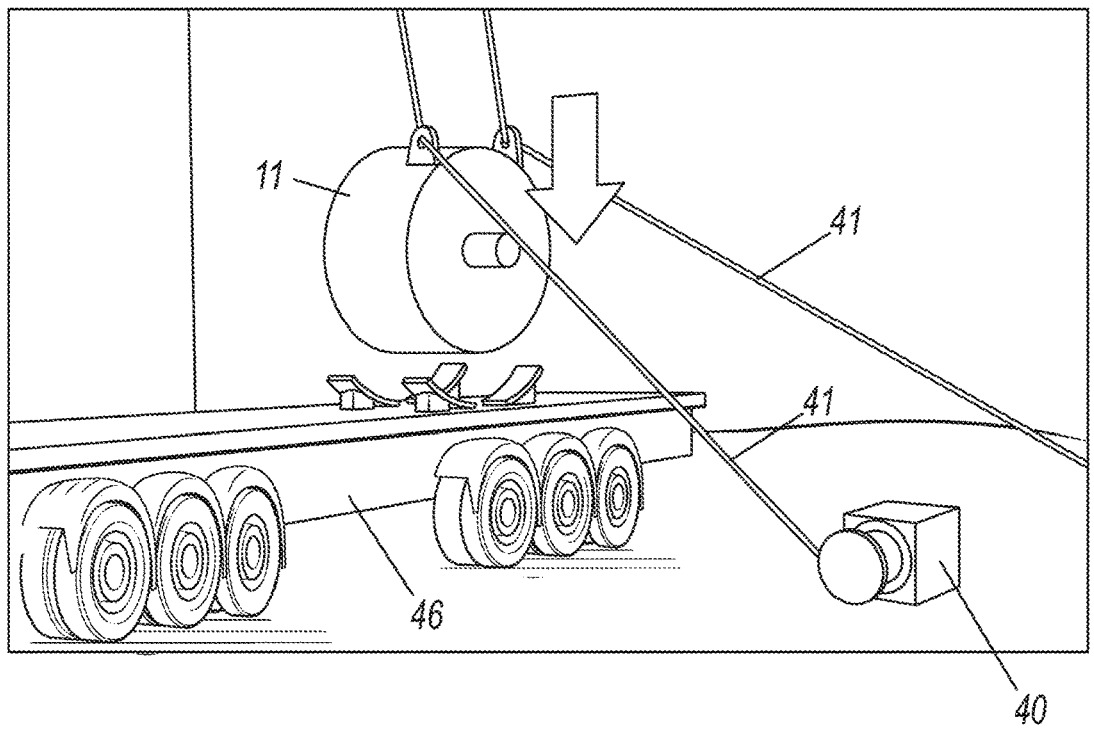

FIG. 28 shows the generator 11 being loaded onto a truck 46. The movements of the generator 11 are still controlled by means of the tag lines 41.

Figure 29:
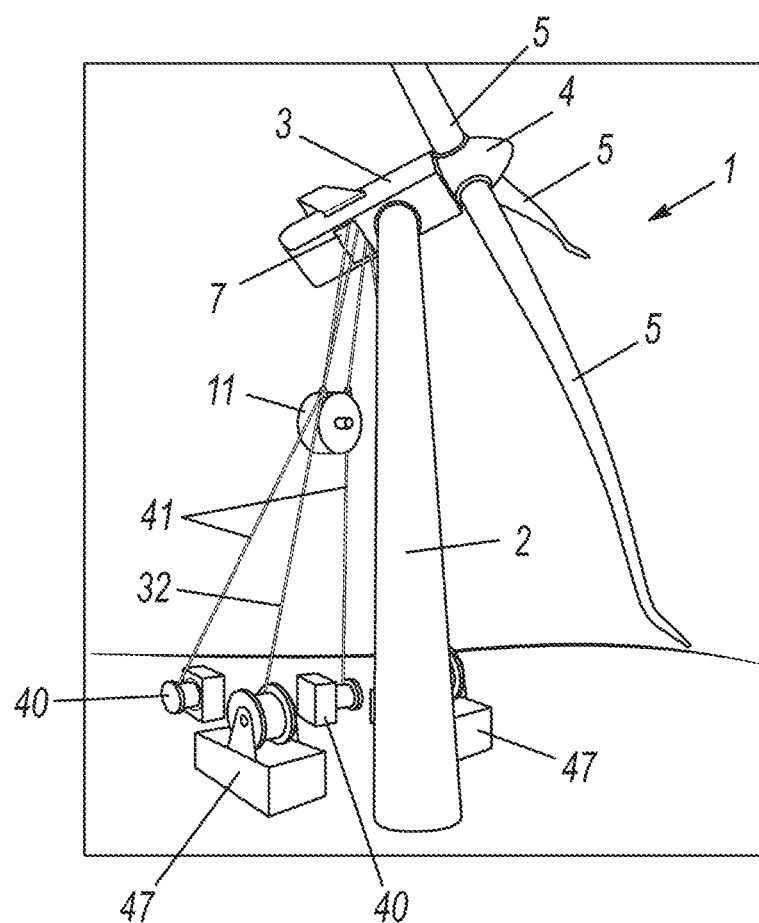

FIG. 29 shows an alternative embodiment in which the generator 11 is lowered towards the ground by means of two ground based winches 47 instead of by means of a hoisting mechanism accommodated in a container. The movements of the generator 11 are controlled partly by means of two tag lines 41, and partly by appropriately controlling operation of the two ground based winches 47 in dependence of each other.

Figure 30:
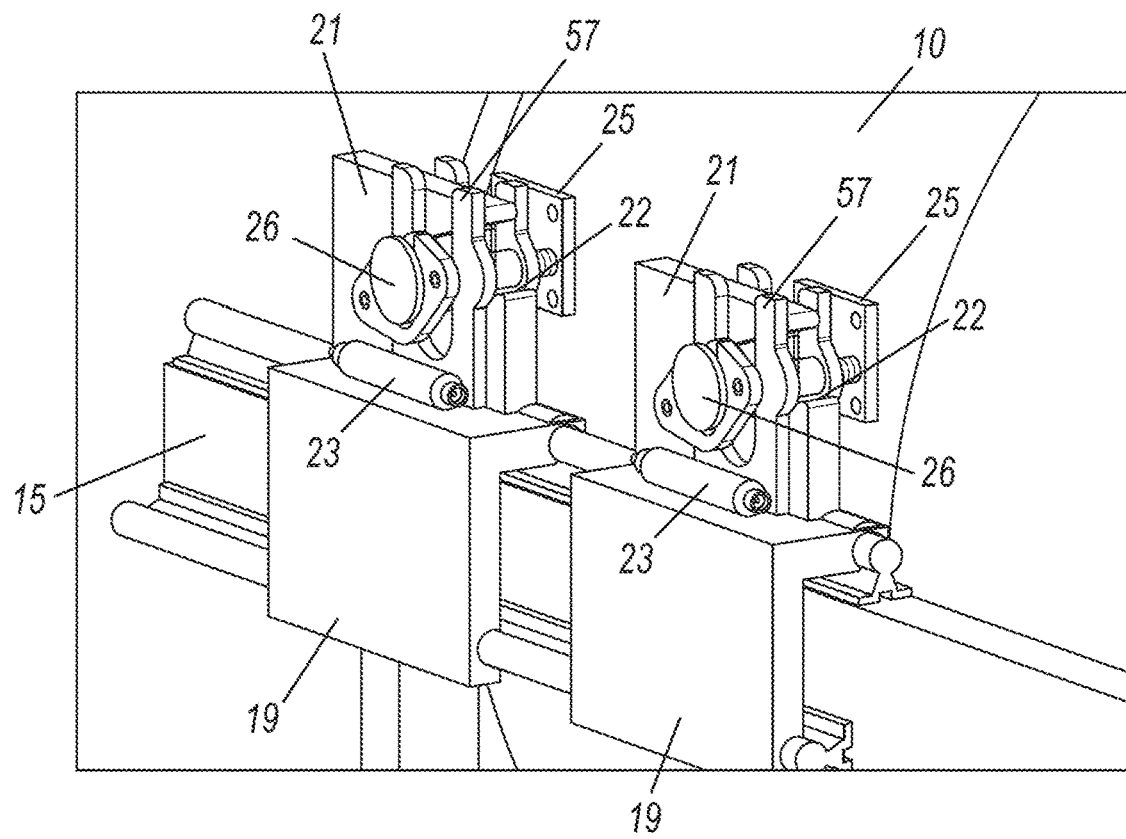
FIGS. 30-32 illustrate a sledge for use in a wind turbine according to an embodiment of the invention.
Figure 31:
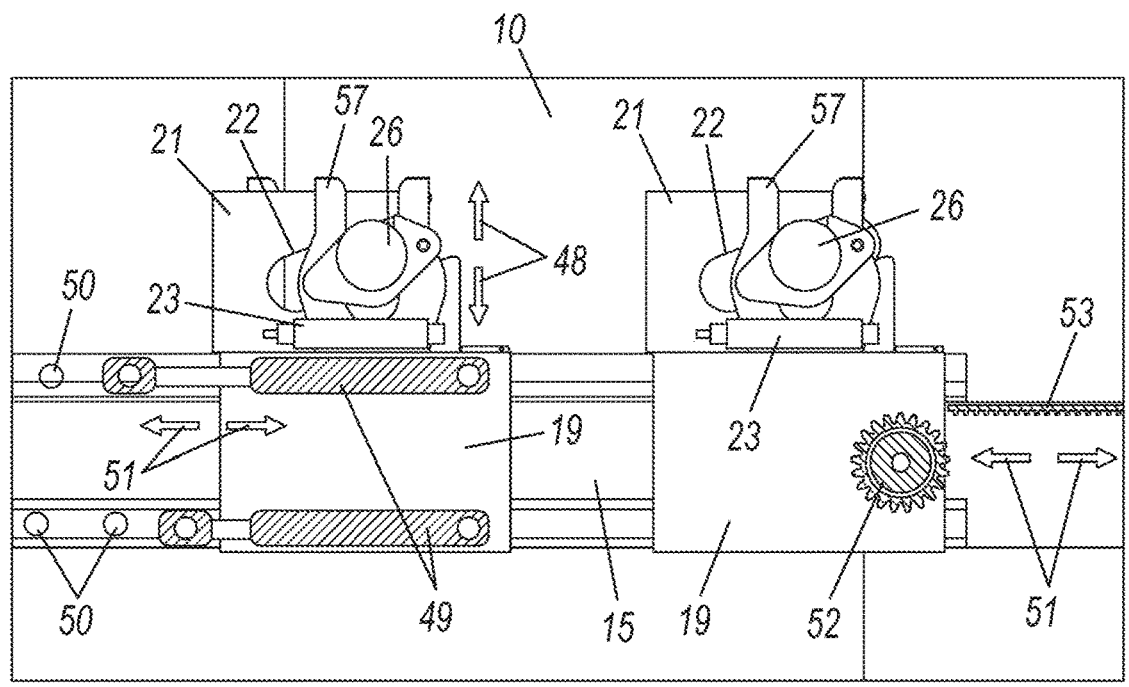
Figure 32:
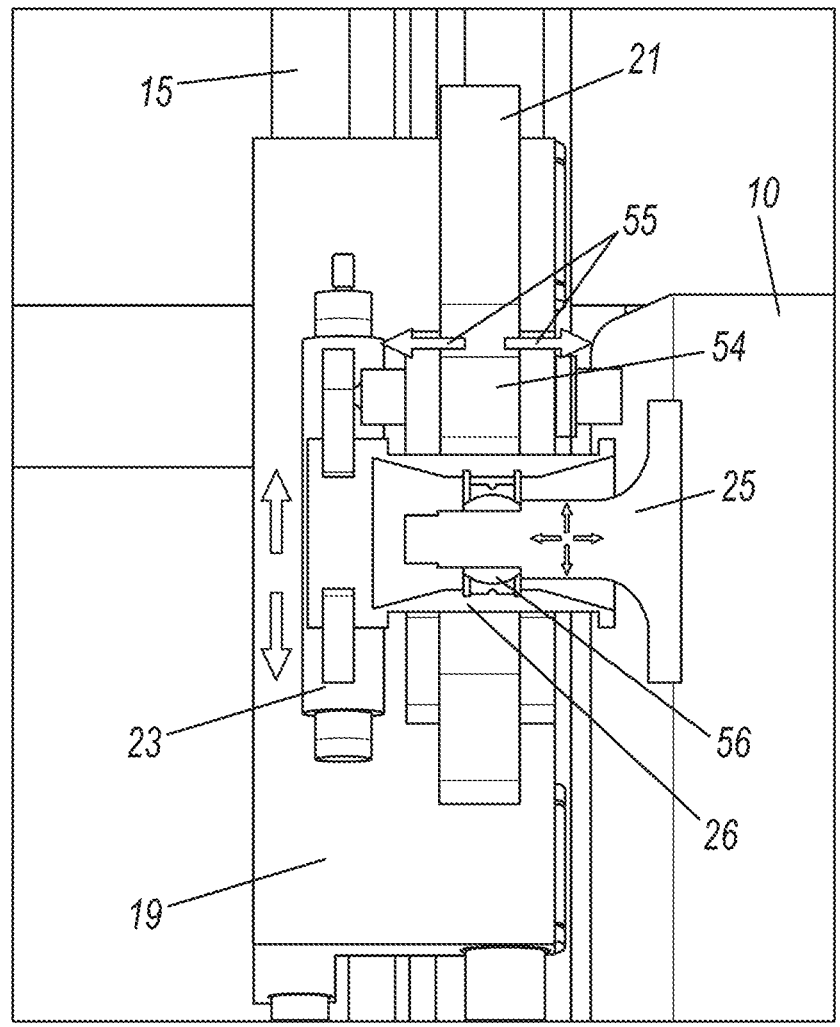

FIGS. 30-32 show the sledges 19 described above in further detail. FIG. 30 is a perspective view of two sledges 19 mounted movably on a sliding rail 15. Each sledge 19 comprises a guiding part 21 and a mating part 25 mounted on a drive train component, e.g. in the form of a gearbox 10. The guiding part 21 is provided with a guiding track 22, and the mating part 25 is provided with a protruding part 26 which is arranged in engagement with the guiding track 22 of the guiding part 21. A hydraulic piston 23 is arranged for providing relative movements between the guiding part 21 and the mating part 25 along a direction defined by the sliding rail 15.

When the guiding part 21 and the mating part 25 perform relative movements along the direction defined by the sliding rail 15, the protruding part 26 of the mating part 25 is caused to move along the guiding track 22 of the guiding part 21. Thereby the orientation and/or the position of the gearbox 10 relative to the sliding rail 15 can be adjusted. By performing relative movements of one of the sledges 19 in one direction while keeping the other sledge immovable or performing relative movements in an opposite direction, a rotational axis of the gearbox 10 is tilted relative to the direction defined by the sliding rail 15. If relative movements are performed by both sledges 19 in the same direction while sledges 19 arranged on an opposite side of the gearbox 10 are kept immovable or perform relative movements in an opposite direction, then the gearbox 10 will rotate about its rotational axis. If all of the sledges 19 perform relative movements in the same direction, then the gearbox 10 is moved in a translational manner in an upwards or downwards direction.

FIG. 31 is a side view of the sledges 19 of FIG. 31. Arrows 48 illustrate the relative movement between the protruding part 26 and the guiding track 22 of one of the sledges 19 as a consequence of operation of the hydraulic piston 23.

One of the sledges 19 is provided with two hydraulic pistons 49 which are used for moving the sledge 19 along the sliding rail 15. This takes place in the following manner. The hydraulic pistons 49 are each arranged in engagement with one of a number of recesses 50 formed in the sliding rail 15. One of the hydraulic pistons 49 is then operated in order to move the sledge 19 as indicated by arrows 51. Then one of the hydraulic pistons 49 is moved into engagement with another one of the recesses 50 while the other hydraulic piston 49 remains engaged with the recess 50, before one of the hydraulic pistons 49 is once again operated in order to move the sledge 19 further along the sliding rail 15. Thereby it is ensured that the sledge 19 does not accidentally slide along the sliding rail 15 when the hydraulic pistons 49 are moved in and out of engagement with the recesses 50. This is in particular relevant when the sliding rail 15 is inclined with respect to a horizontal direction.

The other sledge 19 is provided with an alternative moving mechanism comprising a toothed gear wheel 52 arranged the sledge 19 and a toothed rack 53 arranged on the sliding rail 15. Thereby the sledge 19 can be moved along the sliding rail 15 as indicated by arrows 51 by rotating the gear wheel 52 while it engages the toothed rack 53.

FIG. 32 is a top view of one of the sledges 19 of FIGS. 30 and 31. It can be seen from FIG. 32 that the sledge 19 is provided with an additional hydraulic piston 54 which causes relative movements of the guiding part 21 and the mating part 25 along the direction indicated by arrows 55, thereby allowing the position and/or the orientation of the gearbox 10 to be adjusted along this direction.

Furthermore, a spherical joint 56 is provided in the protruding part 26 of the mating part 25. This allows the protruding part 26 and the portion of the mating part 25 which is attached to the drive train component to perform relative movements. This, in turn, allows the guiding part 21 and the mating part 25 to move freely relative to each other when the hydraulic pistons 23, 54 are operated. Accordingly, it is possible to adjust the position and/or the orientation of the gearbox 10 with respect to six degrees of freedom.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art. The scope of the invention is thus indicated by the appended claims and all changes which come within the meaning and range of equivalency of the claims are therefore intended to be embraced.

The invention claimed is:

1. A wind turbine, comprising:
a tower,
at least one nacelle mounted on the tower and housing a plurality of drive train components, and
a transportation system for moving at least one drive train component of the plurality of drive train components of the wind turbine, the transportation system comprising:
at least one sliding rail configured to carry the at least one drive train component during movement, and
at least one sledge connected to the at least one sliding rail and being configured to be attached to the at least one drive train component, thereby allowing the at least one drive train component to move along the at least one sliding rail,
wherein the at least one sliding rail comprises two or more rail modules being detachably connected to each other along a longitudinal direction of the at least one sliding rail, and
wherein one of the two or more rail modules of the at least one sliding rail is attached directly to one of the plurality of drive train components.

2. The wind turbine according to claim 1, further comprising a support structure arranged to support the at least one sliding rail at one end, the support structure being arranged between the at least one sliding rail and a load carrying structure of the nacelle.

3. The wind turbine according to claim 1, further comprising an adjustment mechanism for adjusting an inclination of the at least one sliding rail relative to the nacelle.

4. The wind turbine according to claim 1, wherein the at least one sliding rail extends along a direction which is substantially parallel to a direction defined by a main shaft of the wind turbine.

5. The wind turbine according to claim 1, wherein the at least one sliding rail comprises at least two sliding rails extending below a centre of gravity of the plurality of drive train components.

6. The wind turbine according to claim 1, wherein the at least one sledge comprises:
a guiding part comprising a guiding track, the guiding part being configured to be mounted movably on the at least one sliding rail, and
a mating part comprising a protruding part being arranged in engagement with the guiding track of the guiding part, the mating part being configured to be attached to the at least one drive train component, wherein relative movement between the guiding part and the mating part of the at least one sledge causes a change in orientation of the at least one drive train component having the at least one sledge attached thereto, relative to the at least one sliding rail, due to the protruding part of the mating part moving along the guiding track of the guiding part.

7. The wind turbine according to claim 1, wherein one of the plurality of drive train components is provided with at least one interface portion configured to have one of the two or more rail modules attached thereto.

8. The wind turbine according to claim 1, wherein the at least one sliding rail is configured to support the at least one drive train component during movement.

9. A transportation system for use in a wind turbine, the wind turbine comprising a tower, and at least one nacelle mounted on the tower and housing a plurality of drive train components, the transportation system for moving at least one drive train component of the plurality of drive train components and comprising:
at least one sliding rail configured to carry the at least one drive train component during movement, and
at least one sledge connected to the at least one sliding rail and being configured to be attached to the at least one drive train component, thereby allowing the at least one drive train component to move along the at least one sliding rail,
wherein the at least one sliding rail comprises two or more rail modules being detachably connected to each other along a longitudinal direction of the at least one sliding rail, and
wherein one of the two or more rail modules of the at least one sliding rail is attached directly to one of the plurality of drive train components.

10. A method for unmounting a drive train component of a wind turbine, the wind turbine comprising a tower and at least one nacelle mounted on the tower and housing a plurality of drive train components, the method comprising the steps of:
mounting a first rail module of at least one sliding rail on a first drive train component of the plurality of drive train components,
attaching at least a second rail module to the first rail module, thereby forming the at least one sliding rail,
movably mounting at least one sledge on the at least one sliding rail,
attaching the at least one sledge to a second drive train component of the plurality of drive train components to be unmounted,
detaching the second drive train component to be unmounted from one of the plurality of drive train components, and
moving the second drive train component to be unmounted along the at least one sliding rail by means of the at least one sledge.

11. The method according to claim 10, further comprising the step of adjusting an inclination of the at least one sliding rail, prior to moving the second drive train component to be unmounted.

12. The method according to claim 10, further comprising the step of dismantling the at least one sliding rail when moving of the second drive train component to be unmounted has been completed.

13. A method for mounting a drive train component in a wind turbine, the wind turbine comprising a tower and at least one nacelle mounted on the tower and housing a plurality of drive train components, the method comprising the steps of:
mounting a first rail module of at least one sliding rail on a first drive train component of the plurality of drive train components,
attaching at least a second rail module to the first rail module, thereby forming the at least one sliding rail,
movably mounting at least one sledge on the at least one sliding rail,
attaching the at least one sledge to a second drive train component of the plurality of drive train components to be mounted,
moving the second drive train component to be mounted along the at least one sliding rail by means of the at least one sledge, and
attaching the second drive train component to be mounted to one of the plurality of drive train components.

14. The method according to claim 13, further comprising the step of adjusting an orientation of the second drive train component to be mounted relative to a main shaft of the wind turbine prior to attaching the second drive train component to be mounted to the one of the plurality of drive train components.

* * * * *